(12) United States Patent
Matsuoh et al.

(10) Patent No.: US 11,706,839 B2
(45) Date of Patent: Jul. 18, 2023

(54) PORTABLE COMMUNICATION DEVICE COOPERATION SYSTEM, MASTER PORTABLE COMMUNICATION DEVICE, AND SLAVE PORTABLE COMMUNICATION DEVICE

(71) Applicant: CITIZEN WATCH CO., LTD., Tokyo (JP)

(72) Inventors: Daisuke Matsuoh, Nishitokyo (JP); Ryutaro Uemura, Nishitokyo (JP)

(73) Assignee: CITIZEN WATCH CO., LTD, Tokyo (JP)

( * ) Notice: Subject to any disclaimer, the term of this patent is extended or adjusted under 35 U.S.C. 154(b) by 288 days.

(21) Appl. No.: 16/973,964

(22) PCT Filed: Apr. 16, 2019

(86) PCT No.: PCT/JP2019/016362
§ 371 (c)(1),
(2) Date: Dec. 10, 2020

(87) PCT Pub. No.: WO2020/003700
PCT Pub. Date: Jan. 2, 2020

(65) Prior Publication Data
US 2021/0259049 A1 Aug. 19, 2021

(30) Foreign Application Priority Data

Jun. 28, 2018 (JP) .................................. 2018-123358
Feb. 27, 2019 (JP) .................................. 2019-034346

(51) Int. Cl.
*G06F 15/16* (2006.01)
*H04W 84/20* (2009.01)

(52) U.S. Cl.
CPC .................................. *H04W 84/20* (2013.01)

(58) Field of Classification Search
CPC ...................................................... H04W 84/20
See application file for complete search history.

(56) References Cited

U.S. PATENT DOCUMENTS 6,751,164 B1 * 6/2004 Sekiguchi .............. G04G 21/00
368/80
7,174,381 B2 * 2/2007 Gulko ..................... G06F 8/451
717/149

(Continued)

FOREIGN PATENT DOCUMENTS

| JP | 2015-117992 A | 6/2015 |
| JP | 2016-145805 A | 8/2016 |
| WO | 01/06329 A1 | 1/2001 |

OTHER PUBLICATIONS

Communication dated Jul. 19, 2021, issued by the State Intellectual Property Office of the P.R.C. in application No. 201980043910.9.

(Continued)

*Primary Examiner* — Oleg Survillo
(74) *Attorney, Agent, or Firm* — Sughrue Mion, PLLC

(57) ABSTRACT

A portable communication device cooperation system includes a slave portable communication device that can communicate with a master portable communication device. Each of a plurality of slave-side slots of a slave-side storage unit included in the slave portable communication device stores a slave application program transferred from a master-side slot disposed in the master portable communication device. The slave application program includes part of information of a master application program, and causes the slave portable communication device to operate by being executed by a slave-side control unit of the slave portable communication device. As a result, the portable communication device cooperation system, the master portable communication device, and the slave portable communication (Continued)

device exhibit an effect of enabling the slave portable communication device to be variously used.

14 Claims, 10 Drawing Sheets

(56) References Cited

U.S. PATENT DOCUMENTS

| | | | | |
|---|---|---|---|---|
| 10,765,831 | B1* | 9/2020 | Skluzacek | G16H 40/63 |
| 2004/0172626 | A1* | 9/2004 | Jalan | G06F 8/458 |
| | | | | 717/149 |
| 2006/0184819 | A1* | 8/2006 | Takagi | H04L 69/40 |
| | | | | 714/4.1 |
| 2007/0186092 | A1* | 8/2007 | Uemura | G06F 15/177 |
| | | | | 713/2 |
| 2008/0016175 | A1* | 1/2008 | Glazberg | H04L 67/131 |
| | | | | 709/208 |
| 2012/0179884 | A1* | 7/2012 | Araki | A63F 13/31 |
| | | | | 711/159 |
| 2015/0168920 | A1* | 6/2015 | Nishihara | G04G 21/00 |
| | | | | 368/187 |

OTHER PUBLICATIONS

Extended European Search Report dated Feb. 21, 2022 in European Application No. 19825258.7.
Office Action dated Jan. 4, 2022 in Japanese Application No. 2021-070799.
Chinese Decision dated Dec. 28, 2021 in Chinese Application No. 201980043910.9.
Notice of Reasons for Refusal for corresponding JP 2019-034346, dated Oct. 27, 2020.
International Search Report for PCT/JP2019/016362, dated Jul. 16, 2019.
Communication dated Feb. 2, 2021, from the Japanese Patent Office in Application No. 2019-034346.

* cited by examiner

PORTABLE COMMUNICATION DEVICE COOPERATION SYSTEM, MASTER PORTABLE COMMUNICATION DEVICE, AND SLAVE PORTABLE COMMUNICATION DEVICE

CROSS REFERENCE TO RELATED APPLICATIONS

This application is a National Stage of International Application No. PCT/JP2019/016362 filed Apr. 16, 2019, claiming priority based on Japanese Patent Application No. 2018-123358 filed Jun. 28, 2018 and Japanese Patent Application No. 2019-034346 filed Feb. 27, 2019.

FIELD

The present invention relates to a portable communication device cooperation system, a master portable communication device, and a slave portable communication device.

BACKGROUND

As a conventional portable communication device cooperation system, for example, Patent Literature 1 discloses a system that may change a function of a watch constituting a portable communication device based on information acquired from an external device.

CITATION LIST

Patent Literature

Patent Literature 1: Re-publication of PCT International Publication WO2001/006329

SUMMARY

Technical Problem

Regarding the system disclosed in Patent Literature 1 described above, for example, there is the demand that the watch can be used more variously.

The present invention has been made in view of the situation described above, and provides a portable communication device cooperation system, a master portable communication device, and a slave portable communication device for enabling portable communication devices to be used variously.

Solution to Problem

In order to solve the above mentioned problem, a portable communication device cooperation system according to the present invention includes a master portable communication device including a master-side communication unit configured to be able to communicate with an outside, a master-side storage unit including a plurality of master-side slots configured to be able to respectively store application programs, and a master-side control unit configured to execute the application programs stored in the master-side storage unit; and a slave portable communication device including a slave-side communication unit configured to be able to communicate with the outside, a slave-side storage unit including a plurality of slave-side slots configured to be able to respectively store application programs, and a slave-side control unit configured to execute the application programs stored in the slave-side storage unit, wherein the master-side slots respectively store master application programs configured to cause the master portable communication device and the slave portable communication device to operate in cooperation with each other by being executed by the master-side control unit and the slave-side control unit, and the slave-side slots respectively store slave application programs that are each transferred from a corresponding one of the master-side slots via the master-side communication unit and the slave-side communication unit, each include part of information of the master application program, and are each configured to cause the slave portable communication device to operate by being executed by the slave-side control unit.

Further, in the portable communication device cooperation system, it is possible to configure that the master portable communication device or the slave portable communication device includes a switching operation unit configured to receive an operation of switching the slave application program executed by the slave-side control unit among the slave application programs stored in the respective slave-side slots.

Further, in the portable communication device cooperation system, it is possible to configure that the master-side control unit and the slave-side control unit switch a combination of the master application programs to be stored in the master-side slots and a combination of the slave application programs to be stored in the slave-side slots in accordance with a switching condition set in advance.

Further, in the portable communication device cooperation system, it is possible to configure that the slave-side slots include a reference slot that is set to be distinguished from the other slave-side slots in advance.

Further, in the portable communication device cooperation system, it is possible to configure that the reference slot stores the slave application program for causing the slave portable communication device to display a time.

Further, in the portable communication device cooperation system, it is possible to configure that the reference slot is selected by the slave-side control unit and the slave application program stored in the reference slot is executed in a case in which an operation corresponding to the slave application program stored in the other slave-side slot ends, in a case in which any of the slave application programs is not executed by the slave-side control unit, in a case in which communication with the outside via the slave-side communication unit is disabled, in a case of returning from the state in which communication with the outside via the slave-side communication unit is disabled, in a case in which the slave application program is not stored in the other slave-side slot, or in a case in which electric power of a power supply of the slave portable communication device becomes equal to or smaller than a threshold set in advance.

Further, in the portable communication device cooperation system, it is possible to configure that the slave portable communication device is a wearable device that is able to be put on a human body.

Further, in the portable communication device cooperation system, it is possible to configure that the slave portable communication device is an electronic watch that displays a time by an indicator.

Further, in the portable communication device cooperation system, it is possible to configure to further include an external device configured to store the master application programs, wherein the master portable communication device is able to download the master application programs from the external device via the master-side communication unit.

Further, in the portable communication device cooperation system, it is possible to configure that the master application programs each include a service block program that defines output information to be output in accordance with service content, a trigger block program that defines content of a trigger for starting an action for outputting the output information and a trigger generation unit that generates the trigger to cause the trigger generation unit to generate the trigger, and an action block program that defines content of the action for outputting the output information and an action execution unit that executes the action to cause the action execution unit to execute the action, and the slave application program includes at least part of the service block program, the trigger block program, or the action block program.

Further, in the portable communication device cooperation system, it is possible to configure that when the master application programs are stored in the master-side slots in a state in which the master portable communication device and the slave portable communication device are disabled from communicating with each other via the master-side communication unit and the slave-side communication unit, the master-side control unit collectively transmits the slave application programs corresponding to the master application programs stored in the master-side slots in the communication disabled state to the slave portable communication device at the time when the master portable communication device and the slave portable communication device are enabled to communicate with each other via the master-side communication unit and the slave-side communication unit.

Further, in the portable communication device cooperation system, it is possible to configure that the master portable communication device includes a display unit configured to be controlled by the master-side control unit and to be able to display an image, the display unit is able to display a selected slot image representing the slave-side slot that stores the slave application program that is currently selected as the slave application program executed by the slave-side control unit among the slave application programs stored in the respective slave-side slots, the selected slot image includes a slot image representing the slave-side slot other than the reference slot among the slave-side slots and an indicator image representing an indicator, and the master-side control unit causes the display unit to display the selected slot image and indicates the corresponding slot image by the indicator image in a case in which the slave-side slot that stores the slave application program that is currently selected is the slave-side slot other than the reference slot, and causes the display unit to display the selected slot image and indicates a position other than the slot image by the indicator image in a case in which the slave-side slot that stores the slave application program that is currently selected is the reference slot.

Further, in the portable communication device cooperation system, it is possible to configure that the master portable communication device includes a display unit configured to be controlled by the master-side control unit and to be able to display an image, the display unit is able to display a selected slot image representing the slave-side slot that stores the slave application program that is currently selected as the slave application program executed by the slave-side control unit among the slave application programs stored in the respective slave-side slots, and the master-side control unit causes the display unit to display the selected slot image in a case in which the master portable communication device and the slave portable communication device are enabled to communicate with each other via the master-side communication unit and the slave-side communication unit, and causes the display unit not to display the selected slot image in a case in which the master portable communication device and the slave portable communication device are disabled from communicating with each other via the master-side communication unit and the slave-side communication unit.

In order to solve the above mentioned problem, a master portable communication device according to the present invention includes a master-side communication unit configured to be able to communicate with a slave portable communication device including a slave-side communication unit configured to be able to communicate with an outside, a slave-side storage unit including a plurality of slave-side slots configured to be able to respectively store application programs, and a slave-side control unit configured to execute the application programs stored in the slave-side storage unit; a master-side storage unit including a plurality of master-side slots configured to be able to respectively store application programs; and a master-side control unit configured to execute the application programs stored in the master-side storage unit, wherein the master-side slots respectively store master application programs executed by the master-side control unit and the slave-side control unit, and the master-side communication unit transfers, to the slave portable communication device, a slave application program that includes part of information of the master application program stored in each of the master-side slots and causes the slave portable communication device to operate by being executed by the slave-side control unit, and causes each of the corresponding slave-side slots to store the transferred slave application program.

In order to solve the above mentioned problem, a slave portable communication device according to the present invention includes a slave-side communication unit configured to be able to communicate with a master portable communication device including a master-side communication unit configured to be able to communicate with an outside, a master-side storage unit including a plurality of master-side slots configured to be able to respectively store application programs, and a master-side control unit configured to execute the application programs stored in the master-side storage unit; a slave-side storage unit including a plurality of slave-side slots configured to be able to respectively store application programs; and a slave-side control unit configured to execute the application programs stored in the slave-side storage unit, wherein the slave-side slots respectively store slave application programs that are each transferred from a corresponding one of the master-side slots via the master-side communication unit and the slave-side communication unit, and each include part of information of master application programs that are respectively stored in the master-side slots and executed by the master-side control unit and the slave-side control unit to be executed by the slave-side control unit.

Advantageous Effects of Invention

The portable communication device cooperation system according to the present invention includes a master portable communication device and a slave portable communication device that can communicate with each other via a master-side communication unit and a slave-side communication unit. The master portable communication device stores a master application program in each of a plurality of master-side slots of a master-side storage unit. Each master application program is executed by a master-side control unit and a slave-side control unit to cause the master portable communication device and the slave portable communication device to operate in cooperation with each other. The slave portable communication device then stores, in each of a plurality of slave-side slots of a slave-side storage unit, a slave application program that is transferred from a corresponding master-side slot via the master-side communication unit and the slave-side communication unit. Each slave application program constitutes part of a corresponding master application program, and is executed by the slave-side control unit to cause the slave portable communication device to operate. As a result, the portable communication device cooperation system, the master portable communication device, and the slave portable communication device exhibits an effect of enabling the portable communication device to be variously used.

DESCRIPTION OF EMBODIMENTS

The following describes an embodiment of the present invention in detail based on the drawings. The present invention is not limited to the embodiment. Constituent elements in the following embodiment encompass a constituent element that can be replaced and easily conceived by those skilled in the art, and substantially the same constituent element.

Embodiment

<Outline of Portable Communication Device Cooperation System>

Figure 1:
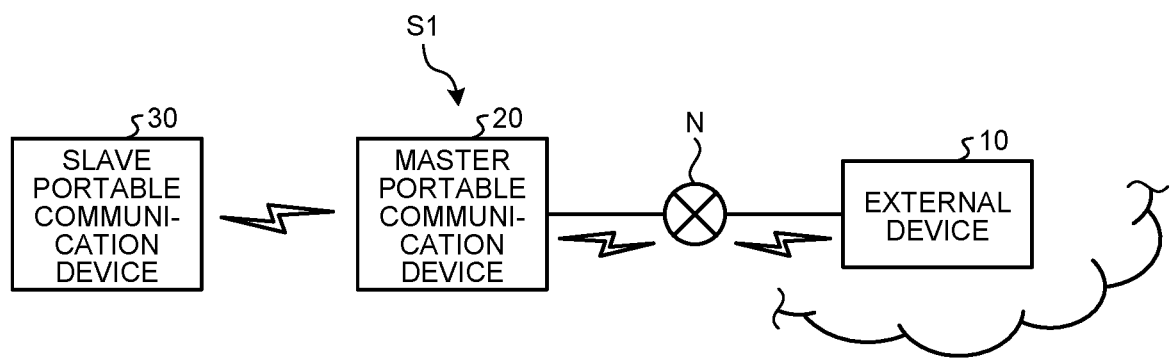
FIG. 1 is a block diagram illustrating a schematic configuration of a portable communication device cooperation system according to an embodiment.

A portable communication device cooperation system S1 according to the present embodiment illustrated in FIG. 1 includes an external device 10, a master portable communication device 20, and a slave portable communication device 30, which communicate and cooperate with each other to enable the slave portable communication device 30 to be variously used. Typically, the master portable communication device 20 constitutes a communication terminal as a master that communicates with the external device 10 via a network N. On the other hand, the slave portable communication device 30 constitutes a communication terminal as a slave that communicates with the master portable communication device 20 via short-range wireless communication. The network N includes an optional communication network regardless of wireless communication using Wi-Fi (registered trademark), 4G, 5G, and the like, or wired communication using a communication line, and connects the external device 10 with the master portable communication device 20 in a communicable manner. Examples of a scheme of short-range wireless communication includes Bluetooth (registered trademark), W-LAN, Wi-Fi (registered trademark), Near Field Communication (NFC), and the like. Alternatively, the slave portable communication device 30 may have a configuration of being able to communicate with the external device 10 and the master portable communication device 20 via the network N instead of short-range wireless communication. The following describes configurations of the portable communication device cooperation system S1 in detail with reference to the respective drawings.

<Basic Configuration of External Device>

The external device 10 constitutes a cloud service device (cloud server) implemented on the network N. The external device 10 includes an electronic circuit that is mainly constituted of a well-known microcomputer including a central processing unit such as a CPU, various storage devices, and the like. The external device 10 stores a plurality of application programs that can be downloaded to the master portable communication device 20. The external device 10 can also be configured by installing a computer program for implementing various kinds of processing in a computer system such as a known PC and a workstation.

<Basic Configuration of Master Portable Communication Device>

The master portable communication device 20 is an electronic device that can be carried by a user. The master portable communication device 20 can receive various services from the external device 10 by communicating and cooperating with the external device 10. The master portable communication device 20 can include, for example, a smartphone, a tablet PC, a notebook PC, and a PDA.

Figure 2:
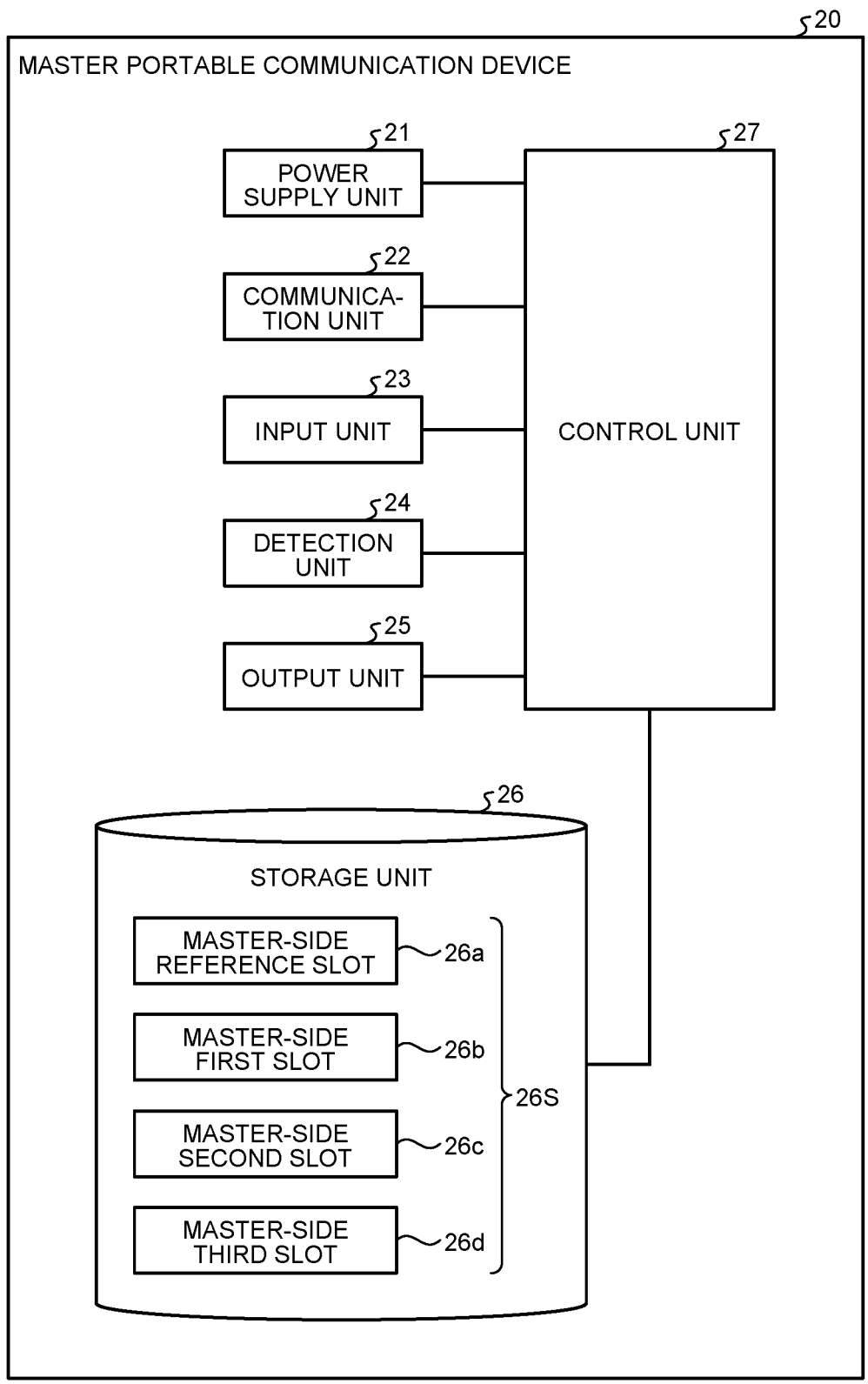
FIG. 2 is a block diagram illustrating a schematic configuration of a master portable communication device included in the portable communication device cooperation system according to the embodiment.

Specifically, as illustrated in FIG. 2, the master portable communication device 20 includes a power supply unit 21, a communication unit 22 serving as a master-side communication unit, an input unit 23, a detection unit 24, an output unit 25, a storage unit 26 serving as a master-side storage unit, and a control unit 27 serving as a master-side control unit.

The power supply unit 21 is a power source of the master portable communication device 20. The power supply unit 21 includes a chargeable/dischargeable secondary cell such as a lithium ion battery, and supplies electric power to each part in the master portable communication device 20.

The communication unit 22 is a communication module that can communicate with the outside of the master portable communication device 20. The communication unit 22 is connected to the network N in a communicable manner regardless of wireless communication or wired communication, and communicates with the external device 10 via the network N. The communication unit 22 also communicates with the slave portable communication device 30 via short-range wireless communication.

The input unit 23 is a portion that receives various inputs to the master portable communication device 20. The input unit 23 includes, for example, a touch panel, an operation button, and the like that receive operation inputs to the master portable communication device 20. For example, the input unit 23 may also include a voice input device that receives a voice input to the master portable communication device 20.

The detection unit 24 is a detector that detects various kinds of information in the master portable communication device 20. The detection unit 24 includes, for example, an acceleration sensor that detects acceleration working on the master portable communication device 20, an illuminance sensor that detects illuminance of light applied to the master portable communication device 20, a temperature sensor that detects a temperature of the vicinity of the master portable communication device 20, a voltage sensor that detects a power supply voltage and the like of the power supply unit 21, a positioning device that measures a present position of the master portable communication device 20, and the like.

The output unit 25 is a portion that performs various outputs in the master portable communication device 20. The output unit 25 includes, for example, a display that outputs image information, a pilot lamp that outputs visual information, a speaker/alarm buzzer that outputs sound information, a vibrator that outputs vibration information, and the like.

The storage unit 26 is a storage device such as a ROM, a RAM, and a semiconductor memory incorporated in the master portable communication device 20. The storage unit 26 stores conditions and information required for various kinds of processing performed by the master portable communication device 20, various application programs executed by the master portable communication device 20, control data, and the like. The storage unit 26 can also store various kinds of information received by the communication unit 22, various kinds of information input via the input unit 23, various kinds of information detected by the detection unit 24, various kinds of information output by the output unit 25, and the like. These pieces of information are read out from the storage unit 26 by the control unit 27 and the like as needed. The storage unit 26 according to the present embodiment includes a plurality of master-side slots 26S as storage regions that are divided to individually store application programs. The master-side slots 26S will be described later in detail.

The control unit 27 is electrically connected to respective parts of the master portable communication device 20, and integrally controls the respective parts of the master portable communication device 20. The control unit 27 includes an electronic circuit that is mainly constituted of a well-known microcomputer including a central processing unit such as a CPU. The control unit 27 is connected to the respective parts of the master portable communication device 20 in a communicable manner, and can exchange various signals with the respective parts. The control unit 27 executes various application programs stored in the storage unit 26, and causes the respective parts of the master portable communication device 20 to operate by operation of the application program to perform various kinds of processing for implementing various functions.

<Basic Configuration of Slave Portable Communication Device (Electronic Watch)>

Next, the following describes the slave portable communication device 30. Similarly to the master portable communication device 20, the slave portable communication device 30 is an electronic device that can be carried by the user. The slave portable communication device 30 can receive various services together with the master portable communication device 20 by communicating and cooperating with the master portable communication device 20. For example, the slave portable communication device 30 can include a smartphone, a tablet PC, a notebook PC, a PDA, and the like, but herein, it is preferable that the slave portable communication device 30 includes a wearable device that is smaller than the master portable communication device 20 and can be put on a human body.

In the following description, the slave portable communication device 30 according to the present embodiment is assumed to include an electronic watch 30A illustrated in FIG. 3 as an example of the wearable device. The electronic watch 30A according to the present embodiment is a wristwatch that is put on an arm via a belt 2 coupled to an exterior case 1. The electronic watch 30A is an analog electronic watch (analog quartz watch) that displays a time by indicating an index (division) 4a on a dial plate 4 by a physical indicator 3 housed in the exterior case 1. Alternatively, the electronic watch 30A may be a combination electronic watch (combination quartz watch) partially including digital display along with analog indicator display. The electronic watch 30A displays a calendar with a date plate 5 that is partially exposed from a date window 4b on the dial plate 4. The electronic watch 30A can display a time and a date in accordance with a relative positional relation of the indicator 3 and the date plate 5 with respect to the dial plate 4. Herein, the electronic watch 30A includes a second hand 3a, a minute hand 3b, an hour hand 3c, and a small hand 3d as a plurality of the indicators 3. The second hand 3a, the minute hand 3b, and the hour hand 3c are coaxially disposed, rotated, and driven about a center axis X1 as a rotation center, and display a second, a minute, and an hour, respectively. The small hand 3d is rotated and driven about a rotation axis X2, which is different from the center axis X1, as a rotation center, and constitutes a functional hand of a register (instrument) 6 within the dial plate 4. In the electronic watch 30A, a crown 7 and push buttons 8A and 8B are provided so as to project from an outer peripheral surface of the exterior case 1. In the electronic watch 30A, respective parts in the exterior case 1 operate together to receive various operations in accordance with a pulling-out/rotating operation on the crown 7 and a pressing-down operation on the push buttons 8A and 8B.

Figure 4:
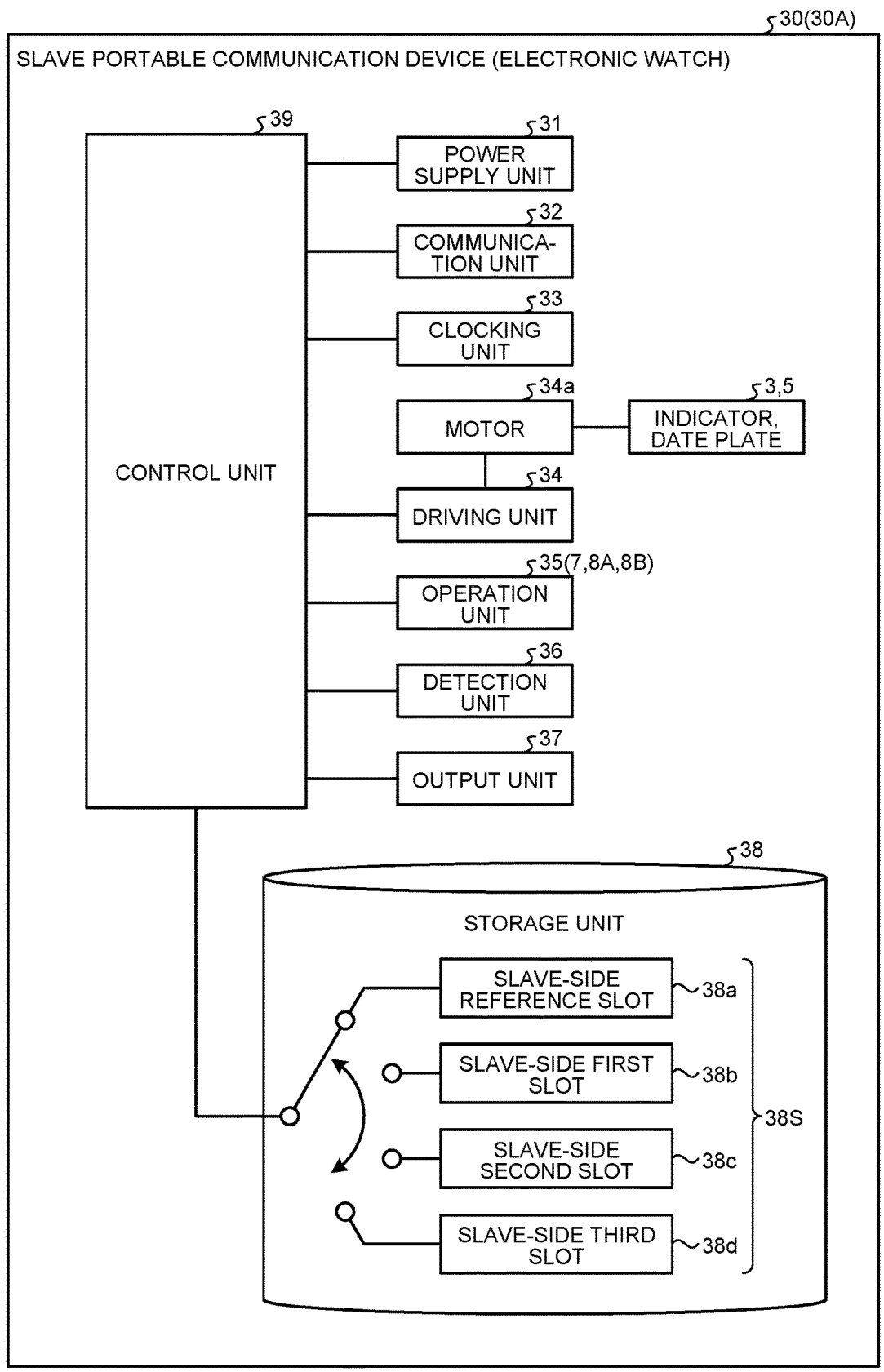
FIG. 4 is a block diagram illustrating a schematic configuration of the slave portable communication device included in the portable communication device cooperation system according to the embodiment.

More specifically, as illustrated in FIG. 4, the slave portable communication device 30 (electronic watch 30A) includes a power supply unit 31, a communication unit 32 serving as a slave-side communication unit, a clocking unit 33, a driving unit 34, an operation unit 35, a detection unit 36, an output unit 37, a storage unit 38 serving as a slave-side storage unit, and a control unit 39 serving as a slave-side control unit.

The power supply unit 31 is a power source of the slave portable communication device 30. The power supply unit 31 includes a chargeable/dischargeable secondary cell such as a lithium ion battery and a power generation element that can generate electric power such as a solar cell, and supplies electric power to the respective parts in the electronic watch 30A.

The communication unit 32 is a communication module that can communicate with the outside of the slave portable communication device 30. The communication unit 32 communicates with the master portable communication device 20 via short-range wireless communication. Alternatively, the communication unit 22 may have a configuration of being connected to the network N in a communicable manner regardless of wireless communication or wired communication, and communicating with the external device 10 and the master portable communication device 20 via the network N.

The clocking unit 33 is a circuit that clocks a time (watch internal time) to be displayed by the indicator 3. The clocking unit 33 includes, for example, an oscillator, an oscillator circuit, a compensating circuit, a frequency divider circuit, and the like, generates a clock signal having a predetermined frequency as a standard of clocking within the electronic watch 30A, and performs clocking by counting pulses included in the clock signal.

The driving unit 34 is a circuit that rotates and drives the indicator 3 and the date plate 5. The driving unit 34 causes a motor (for example, a stepping motor) 34a to operate by electric power supplied from the power supply unit 31. Rotational force generated by the motor 34a is transmitted to the indicator 3 and the date plate 5 via wheel train and the like, and the indicator 3 and the date plate 5 are rotated and driven. The motor 34a may be individually provided to each of the indicators 3 and the date plate 5, or may be used by some of the indicators 3 and the date plate 5 at the same time.

The operation unit 35 is a portion that receives various external operations on the slave portable communication device 30. The operation unit 35 includes the crown 7, the push buttons 8A and 8B, and the like described above. The operation unit 35 may further include a register ring and the like.

The detection unit 36 is a detector that detects various kinds of information in the slave portable communication device 30. The detection unit 36 includes, for example, an acceleration sensor that detects acceleration working on the slave portable communication device 30, an illuminance sensor that detects illuminance of light applied to the slave portable communication device 30, a temperature sensor that detects a temperature of the vicinity of the slave portable communication device 30, a voltage sensor that detects a power supply voltage of the power supply unit 31 and detects whether electric power is generated, a positioning device that measures a present position of the slave portable communication device 30, and the like.

The output unit 37 is a portion that performs various outputs other than a time and a date in the slave portable communication device 30. The output unit 37 includes, for example, a pilot lamp that outputs visual information, a speaker/alarm buzzer that outputs sound information, a vibrator that outputs vibration information, and the like. In a case in which the electronic watch 30A is a digital electronic watch (digital quartz watch) or an electronic watch partially including analog indicator display and digital display, the output unit 37 may include a display that outputs image information including a time, a date, and function selection in a digital format in place of the physical indicator 3 and date plate 5.

The storage unit 38 is a storage device such as a ROM, a RAM, and a semiconductor memory incorporated in the slave portable communication device 30. The storage unit 38 stores conditions and information required for various kinds of processing performed by the slave portable communication device 30, various application programs executed by the master portable communication device 20, control data, and the like. The storage unit 38 can also store various kinds of information received by the communication unit 32, clocking information clocked by the clocking unit 33, various kinds of information detected by the detection unit 36, various kinds of information output by the output unit 37, and the like. These pieces of information are read out from the storage unit 38 by the control unit 39 and the like as needed. Typically, storage capacity of the storage unit 38 is relatively smaller than that of the storage unit 26 of the master portable communication device 20 described above. The storage unit 38 according to the present embodiment includes a plurality of slave-side slots 38S as storage regions that are divided to individually store application programs. The slave-side slots 38S will be described later in detail.

The control unit 39 is electrically connected to respective parts of the slave portable communication device 30, and integrally controls the respective parts of the slave portable communication device 30. The control unit 39 includes an electronic circuit that is mainly constituted of a well-known microcomputer including a central processing unit such as a CPU. The control unit 39 is connected to the respective parts of the slave portable communication device 30 in a communicable manner, and can exchange various signals with the respective parts. The control unit 39 executes various application programs stored in the storage unit 38, and causes the respective parts of the slave portable communication device 30 to operate by operation of the application programs to perform various kinds of processing for implementing various functions. For example, the control unit 39 performs processing of controlling the motor 34a by the driving unit 34 based on a time clocked by the clocking unit 33, rotating the indicator 3 and the date plate 5 to operate hands, and causing the indicator 3 and the date plate 5 to display the clocked time as a current time. The control unit 39 also performs, for example, various kinds of processing in accordance with content of an operation performed on the operation unit 35 (the crown 7, the push buttons 8A and 8B) by the user. The control unit 39 also performs, for example, processing of switching an operation mode based on a power supply voltage detected by the voltage sensor constituting the detection unit 36. For example, in a case in which the power supply voltage relatively drops or a case in which electric power is not generated for a certain period of time, the control unit 39 can execute a power save (power saving) mode for suppressing power consumption by stopping the operation of the second hand 3a and restricting communication of the communication unit 32. In a case in which the power supply voltage further drops from that in the power save mode, the control unit 39 can interrupt the power supply unit 31 and execute a power break (power supply interruption) mode.

<Basic Configurations of Master-Side Slot and Slave-Side Slot>

The master portable communication device 20 and the slave portable communication device 30 according to the present embodiment implement a configuration of enabling the slave portable communication device 30 to be variously used due to the master-side slots 26S illustrated in FIG. 2 and the slave-side slots 38S illustrated in FIG. 4 cooperating with each other.

Specifically, as described above, the master-side slots 26S are storage regions that are divided to individually store the application programs in the storage unit 26. Similarly, as described above, the slave-side slots 38S are storage regions that are divided to individually store the application programs in the storage unit 38. Each of the master-side slots 26S stores a master application program as the application program. On the other hand, each of the slave-side slots 38S stores, as the application program, a slave application program that is transferred from the corresponding master-side slot 26S via the communication unit 22 and the communication unit 32.

The master application program stored in each of the master-side slots 26S is an application program that causes the master portable communication device 20 and the slave portable communication device 30 to operate in cooperation with each other by being executed by the control unit 27 and the control unit 39. On the other hand, the slave application program stored in each of the slave-side slots 38S is an application program that includes part of information of the master application program stored in the corresponding master-side slot 26S, and causes the slave portable communication device 30 to operate by being executed by the control unit 39. The following firstly describes the master application program in detail, and describes the slave application program again.

<Basic Configuration of Master Applet (Master Application Program)>

Typically, the master application program is a computer program having a relatively small size that is incorporated and executed in another application program such as a browser of the master portable communication device 20. Herein, by way of example, the master application program is assumed to be an applet executed on the browser. Typically, the applet is regarded as an application program the sequence of which is determined. In the following description, the master application program may be referred to as a "master applet". When executed by the control unit 27 and the control unit 39, the master applet causes the master portable communication device 20 and the slave portable communication device 30 to cooperate with each other to perform a predetermined operation.

By way of example, the master applet according to the present embodiment includes a service block program, a trigger block program, and an action block program, and one applet is constructed by combining these three elements. In the following description, the service block program may be referred to as a "service block", the trigger block program may be referred to as a "trigger block", and the action block program may be referred to as an "action block".

The service block is a computer program that defines output information that is output in accordance with service content corresponding to an object desired by the user. In other words, the service block is a computer program that defines content of output information that is desired to be acquired in accordance with the service content.

The trigger block is a computer program that defines content of a trigger for starting an action for outputting output information corresponding to the service content and a trigger generation unit that generates the trigger, and causes the trigger generation unit to generate the trigger. Herein, the trigger is a cue for starting an action corresponding to the service content, and generated by the trigger generation unit. The trigger generation unit is provided in the master portable communication device 20 or the slave portable communication device 30 to generate the trigger. By way of example, as an element that may constitute the trigger generation unit (trigger generation unit candidate) in the master portable communication device 20 and the slave portable communication device 30, exemplified are the input unit 23 and the detection unit 24 of the master portable communication device 20, and the clocking unit 33, the operation unit 35, and the detection unit 36 of the slave portable communication device 30. By way of example, as the trigger generated by the trigger generation unit, exemplified are a predetermined input to the touch panel, the voice input device, and the like constituting the input unit 23, detection of predetermined information by the acceleration sensor, the illuminance sensor, the temperature sensor, the voltage sensor, the positioning device, and the like constituting the detection units 24 and 36, a clocking result obtained by the clocking unit 33, and a predetermined operation on the crown 7, the push buttons 8A and 8B, and the like constituting the operation unit 35. When the master applet including the trigger block is executed by the control unit 27 or the control unit 39, the trigger block causes the trigger generation unit defined by the trigger block to generate the trigger.

The action block is a computer program that defines content of an action for outputting output information corresponding to the service content and an action execution unit that executes the action, and causes the action execution unit to execute the action. Herein, the action is an operation corresponding to content of a service provided by the master applet, and executed by the action execution unit. The action execution unit is provided in the master portable communication device 20 or the slave portable communication device 30 to execute the action. By way of example, as an element that may constitute the action execution unit (action execution unit candidate) in the master portable communication device 20 and the slave portable communication device 30, exemplified are the communication unit 22 and the output unit 25 of the master portable communication device 20, the indicator 3, the date plate 5, the communication unit 32, the driving unit 34, and the output unit 37 of the slave portable communication device 30. By way of example, as the action executed by the action execution unit, exemplified are output of the output information to the outside by the communication units 22 and 32, output of the output information by the display, the pilot lamp, the speaker/alarm buzzer, the vibrator, and the like constituting the output units 25 and 37, and display of the output information by the indicator 3, the date plate 5, and the driving unit 34. When the master applet including the action block is executed by the control unit 27 or the control unit 39, the action block causes the action execution unit defined by the action block to execute the action for outputting the output information.

The master applet configured as described above includes the service block, the trigger block, and the action block described above, and defines the output information corresponding to the service content, the trigger, and the action in association with each other. When being executed by the control unit 27 and the control unit 39, the master applet can cause the action execution unit of the master portable communication device 20 or the slave portable communication device 30 to execute the action of outputting the output information corresponding to the service content by the trigger generated by the trigger generation unit of the master portable communication device 20 or the slave portable communication device 30.

<First Specific Example of Master Applet>

By way of example, the following describes a case in which the output information corresponding to the content of the service provided by the master applet is "position information of a cafe nearest to a present position", the trigger for starting the action is "pressing-down operation on the push button 8A", and the action of outputting the output information corresponding to the service content is "display of the position information of the nearest cafe by the display constituting the output unit 25". In this case, when the user performs pressing-down operation on the push button 8A (trigger generation unit) in a state in which the master applet is started and executed, the slave portable communication device 30 transmits present position information of the slave portable communication device 30 detected by the positioning device of the detection unit 36 to the master portable communication device 20 by the communication unit 32 by being triggered by the pressing-down operation. When the master portable communication device 20 receives the present position information of the slave portable communication device 30 by the communication unit 22, an action of displaying the position information of the cafe nearest to the present position is executed by the display (action execution unit) constituting the output unit 25. In this case, the control unit 27 of the master portable communication device 20 may inquire of the external device 10 about the position information of the cafe nearest to the present position via the communication unit 22, or may read out the position information of the cafe nearest to the present position from the information stored in the storage unit 26.

As a modification of the first specific example, for example, the output unit 37 of the slave portable communication device 30, or the indicator 3, the driving unit 34, and the like in a case in which the slave portable communication device 30 is the electronic watch 30A may be caused to be the action execution unit to execute an action of outputting distance information from the present position to the nearest cafe on the slave portable communication device 30 side to obtain the output information corresponding to the service content. In this case, for example, when a distance to a destination (the nearest cafe) becomes shorter than a predetermined distance (for example, about 100 m to 300 m), an alarm may be output by the speaker, the buzzer, or the vibration motor (action execution unit) constituting the output unit 37. For example, as the distance to the destination (the nearest cafe) becomes relatively shorter, a sounding interval of the alarm output by the speaker, the buzzer, or the vibration motor (action execution unit) constituting the output unit 37 may be caused to be shorter in a stepwise manner (for example, the alarm is sounded at intervals of five minutes in a case in which the distance to the destination is equal to or longer than 200 m and equal to or shorter than 300 m, the alarm is sounded at intervals of one minute in a case in which the distance is equal to or longer than 100 m and equal to or shorter than 200 m, and the alarm is sounded at intervals of thirty seconds in a case in which the distance becomes equal to or shorter than 100 m). For example, a sounding pattern of the alarm output by the speaker, the buzzer, or the vibration motor (action execution unit) constituting the output unit 37 may be variable depending on the distance to the destination (the nearest cafe) (for example, the alarm is intermittently sounded in a case in which the distance to the destination is equal to or longer than 50 m and equal to or shorter than 300 m, and the alarm is continuously sounded in a case in which the distance becomes equal to or shorter than 50 m). Furthermore, the three alarm patterns described above may be appropriately combined. In place of the action of outputting the alarm by the speaker, the buzzer, or the vibration motor, an action of outputting vibration information by the vibrator constituting the output unit 37 may be applied.

<Second Specific Example of Master Applet>

By way of another example, the following describes a case in which the output information corresponding to the content of the service provided by the master applet is "information related to a pedometer function", the trigger for starting the action is "detection of 5000 steps by the acceleration sensor constituting the detection unit 36", and the action of outputting the output information corresponding to the service content is "output of voice information for reporting achievement of 5000 steps by the speaker constituting the output unit 25". In this case, in a state in which the master applet is started and executed, the slave portable communication device 30 starts to count the number of steps of walking by the user with the acceleration sensor (trigger generation unit) constituting the detection unit 36. When the acceleration sensor detects 5000 steps of walking by the user, the slave portable communication device 30 transmits 5000 steps achievement information indicating that 5000 steps are achieved to the master portable communication device 20 by the communication unit 32 by being triggered by detection of the 5000 steps of walking. When the master portable communication device 20 receives the 5000 steps achievement information by the communication unit 22, the speaker (action execution unit) constituting the output unit 25 executes an action of outputting voice information for reporting achievement of 5000 steps.

<Third Specific Example of Master Applet>

As another example, the following further describes a case in which all triggers and actions corresponding to the content of the service provided by the master applet are completed on the slave portable communication device 30 side. Herein, the following describes a case in which the output information corresponding to the content of the service provided by the master applet is "information related to management of a schedule", the trigger for starting the action is "clocking performed by the clocking unit 33 five minutes before a scheduled time for starting an event", and the action of outputting the output information corresponding to the service content is "report display by the indicator 3". In this case, in a state in which the master applet is started and executed, the scheduled time for starting the event and the like are previously registered in the slave portable communication device 30 via the input unit 23 and the like of the master portable communication device 20. When a time five minutes before the scheduled time for starting the event is clocked by the clocking unit 33 (trigger generation unit), the slave portable communication device 30 executes an action of displaying the report that the time five minutes before the scheduled time for starting the event is reached (for example, an action such that the second hand 3*a* quickly rotates multiple times) by the indicator 3 (action execution unit) by being triggered by clocking five minutes before the scheduled time for starting the event.

<Another Specific Example of Master Applet>

In one master applet, at least one combination of the trigger defined by the trigger block and the action defined by the action block is required, but a plurality of combinations of the trigger and the action may be defined. For example, the master applet may be configured such that a plurality of the triggers defined by the trigger block and a plurality of the actions defined by the action block link together. By way of example, for example, when illuminance equal to or higher than predetermined illuminance that is previously set is detected by the illuminance sensor (trigger generation unit) constituting the detection unit 36, the master applet causes the temperature sensor (action execution unit) constituting the detection unit 36 to execute a first action for detecting the temperature by being triggered by detection of the illuminance equal to or higher than the predetermined illuminance as a first trigger. Furthermore, the master applet may be configured to cause, when the temperature equal to or higher than a predetermined temperature that is previously set is detected by the temperature sensor (trigger generation unit), the pilot lamp and the alarm buzzer constituting the output unit 37 to execute a second action for outputting warning by being triggered by detection of the temperature equal to or higher than the predetermined temperature as a second trigger.

<Acquisition of Master Applet>

The master applet configured as described above is stored in each of the master-side slots 26S of the master portable communication device 20. For example, the external device 10 described above stores a plurality of the master applets that are created and published by the user himself/herself, another user, an entrepreneur, and the like. The master portable communication device 20 can download the master applet from the external device 10 via the communication unit 22 and the network N in accordance with an input to the input unit 23 and control by the control unit 27. The master portable communication device 20 then stores the master applet downloaded from the external device 10 in each of the master-side slots 26S. Alternatively, the master portable communication device 20 may read the master applet from a storage medium in which the master applet that is created and published by the user himself/herself, another user, an entrepreneur, and the like is previously stored, and store the master applet in each of the master-side slot 26S. Furthermore, the master portable communication device 20 may directly store, in each of the master-side slots 26S, the master applet that is created by the user himself/herself with the master portable communication device 20 using a software development kit and the like.

<Details about Master-Side Slot>

As illustrated in FIG. 2, the master-side slots 26S according to the present embodiment include a master-side reference slot 26a, a master-side first slot 26b, a master-side second slot 26c, and a master-side third slot 26d, which typically respectively store master applets different from each other. Herein, the master-side reference slot 26a is a slot that is set while being previously distinguished from the other master-side slots 26S (the master-side first slot 26b, the master-side second slot 26c, and the master-side third slot 26d). The master-side reference slot 26a typically stores the master applet that causes a basic function of the slave portable communication device 30 to operate. For example, the basic function of the slave portable communication device 30 according to the present embodiment configured as the electronic watch 30A is typically a function of displaying a time. Thus, the master-side reference slot 26a stores the master applet that causes the slave portable communication device 30 to display a time herein. The master-side reference slot 26a can also store the applet other than the applet that causes a time to be displayed.

<Basic Configuration of Partial Applet (Slave Application Program)>

The slave application program is a partial program that is executed on the slave portable communication device 30 side to cause a function mounted on the slave portable communication device 30 to operate in the master applet (master application program) configured as described above. In the following description, the slave application program may be referred to as a "partial applet" in some cases. That is, the partial applet includes part of the information of the master applet, and corresponds to the partial program for causing each part to operate on the slave portable communication device 30 side in the master applet described above in the specific example, for example. In other words, in the specific example of the master applet described above, the operation related to the slave portable communication device 30 is actually implemented when the partial applet is executed on the slave portable communication device 30 side. The partial applet includes at least part of the service block, the trigger block, or the action block constituting the master applet. The partial applet is stored in each of the slave-side slots 38S of the slave portable communication device 30.

For example, in a case in which the slave portable communication device 30 is the electronic watch 30A, the content included in the partial applet is a rotation direction of the indicator 3, the number of steps of the motor 34a, moving speed, a motor driving frequency, an operation pattern of the indicator 3, an operation pattern of the alarm, and the like. When the service block, the trigger block, and the action block are set in the master applet, operation specifications of the electronic watch 30A (slave portable communication device 30) corresponding to the service content are determined. Accordingly, information of the partial applet described above is created in accordance with a storage format of the slave-side slot 38S to be transferred from the master portable communication device 20 to the slave portable communication device 30, and the partial applet is stored in the slave-side slot 38S corresponding to a number of the master-side slot 26S as described later. Herein, the operation specifications of the slave portable communication device 30 (electronic watch 30A) corresponding to the service content may be successively determined by the control unit 27, or may be previously determined at the time when the master applet is created. Similarly, the information of the partial applet described above corresponding to the storage format of the slave-side slot 38S may be successively created by the control unit 27, or may be previously created at the time when the master applet is created.

<Details about Slave-Side Slot>

As illustrated in FIG. 4, the slave-side slots 38S according to the present embodiment include a slave-side reference slot 38a, a slave-side first slot 38b, a slave-side second slot 38c, and a slave-side third slot 38d, which each store the partial applet of the master applet stored in the corresponding master-side slot 26S. Herein, similarly to the master-side reference slot 26a, the slave-side reference slot 38a is a slot that is set while being previously distinguished from the other slave-side slots 38S (the slave-side first slot 38b, the slave-side second slot 38c, and the slave-side third slot 38d). The slave-side reference slot 38a is a slot associated with the master-side reference slot 26a of the master-side slot 26S. The slave-side reference slot 38a typically stores the partial applet that constitutes part of the master applet stored in the master-side reference slot 26a and causes the basic function of the slave portable communication device 30 to operate. Herein, the slave-side reference slot 38a stores the partial applet for causing the slave portable communication device 30 according to the present embodiment configured as the electronic watch 30A to display a time. The partial applet stored in the slave-side reference slot 38a includes information related to time display (for example, information related to a time, a date, an alarm, a chronograph, a city, a time difference, and the like). The slave-side first slot 38b is a slot associated with the master-side first slot 26b of the master-side slot 26S, and stores a partial applet including part of the information of the master applet stored in the master-side first slot 26b. The slave-side second slot 38c is a slot associated with the master-side second slot 26c of the master-side slot 26S, and stores a partial applet including part of the information of the master applet stored in the master-side second slot 26c. The slave-side third slot 38d is a slot associated with the master-side third slot 26d of the master-side slot 26S, and stores a partial applet including part of the information of the master applet stored in the master-side third slot 26d.

As described later, the slave-side slot 38S is selected by a predetermined operation (for example, a pressing-down operation on the push button 8B and the like) in order, but setting may be made such that, in a case in which the system of the slave portable communication device 30 is initialized by resetting, power break, and the like, the slave-side reference slot 38a that stores the applet for displaying a time is preferentially selected. Due to this, the user can efficiently use the slave portable communication device 30 as a general watch without selecting the applet for the master-side slot 26S and the slave-side slot 38S. Additionally, in this case, the second hand 3a of the slave portable communication device 30 continually operates as a watch after resetting, so that there is the advantage that the user can be prevented from erroneously recognizing a malfunction. Preferential selection of the slave-side reference slot 38a will be described later in detail.

<Transfer of Partial Applet>

When the communication unit 22 of the master portable communication device 20 is caused to be in a state of being enabled to communicate with the communication unit 32 of the slave portable communication device 30, the communication unit 22 transmits the partial applet corresponding to the master applet to the slave portable communication device 30 from each of the master-side slots 26S in accordance with control by the control unit 27. In this case, the communication unit 22 may transmit the partial applet to the slave portable communication device 30 from all of the master-side slots 26S as the occasion demands, or may transmit only the partial applet of the master-side slot 26S in which the master applet is newly stored to the slave portable communication device 30. Alternatively, the communication unit 22 may transmit the partial applet to the slave portable communication device 30 from the master-side slot 26S in a case in which the communication unit 22 is caused to be in the state of being enabled to communicate with the communication unit 32 and the user performs a predetermined input operation on the input unit 23. The communication unit 32 of the slave portable communication device 30 then receives each partial applet transmitted from the communication unit 22 in accordance with control by the control unit 39, and stores the partial applet in each corresponding slave-side slot 38S. In this way, when the communication unit 22 and the communication unit 32 are caused to be in a communication enabled state, the partial applet including part of the information of the master applet is transferred to each slave-side slot 38S via the communication unit 22 and the communication unit 32 from each corresponding master-side slot 26S in accordance with control by the control unit 27 and the control unit 39, and each slave-side slot 38S stores the transferred partial applet.

<Specific Example of Selection of Master Applet and Partial Applet>

Figure 5:
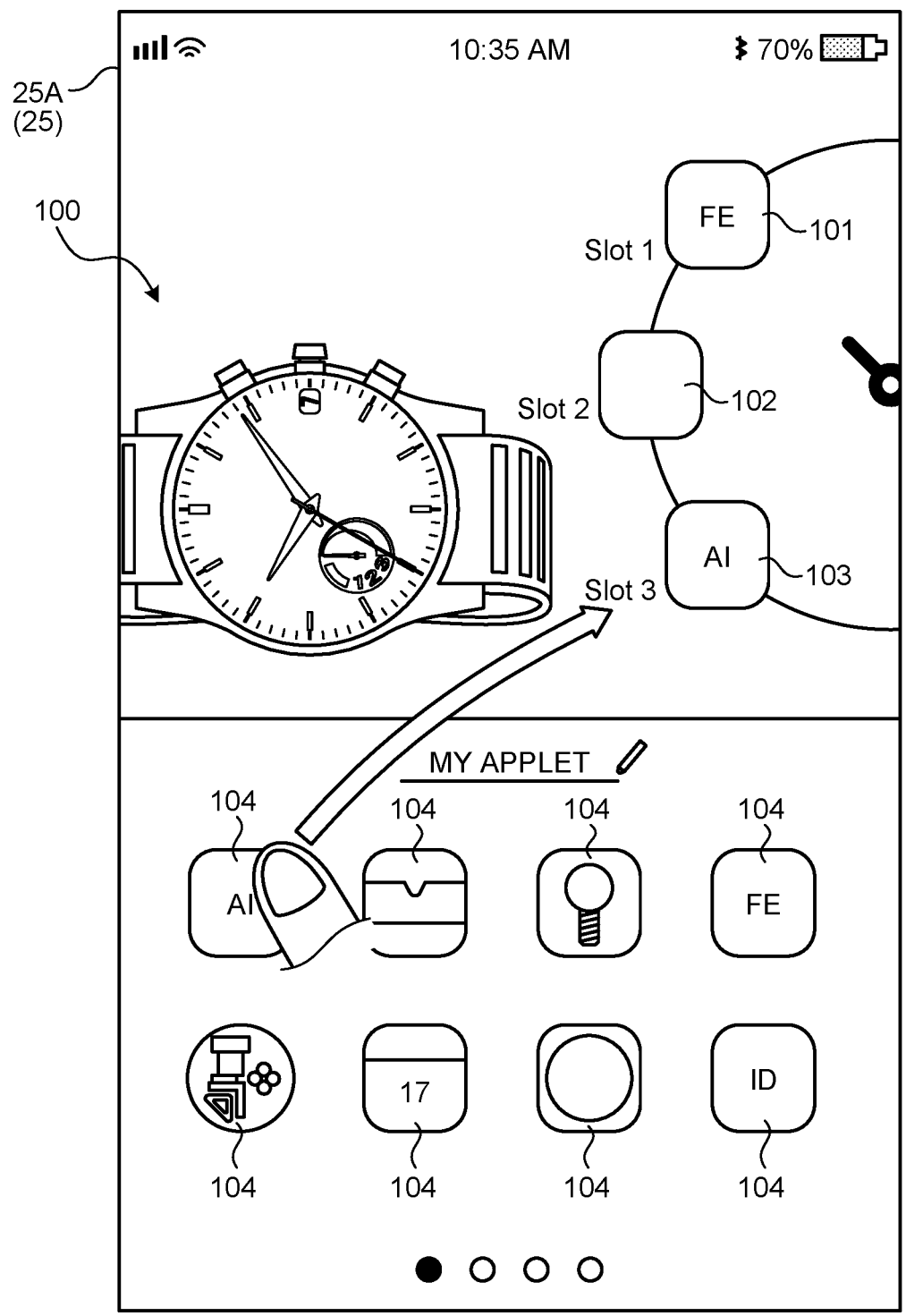
FIG. 5 is a schematic diagram illustrating an example of a selection screen for applets of the portable communication device cooperation system according to the embodiment.

The master applet stored in each master-side slot 26S and the partial applet transferred to each slave-side slot 38S from each master-side slot 26S can be optionally selected by the user via the input unit 23, the output unit 25, and the like of the master portable communication device 20, for example. For example, FIG. 5 illustrates an example of a selection screen 100 for selecting the applet (the master applet, the partial applet) to be set for each slot (the master-side slot 26S, the slave-side slot 38S). The selection screen 100 illustrated in FIG. 5 is displayed on a display 25A constituting the output unit 25. The selection screen 100 includes an icon image 101 representing the first slot (the master-side first slot 26b, the slave-side first slot 38b), an icon image 102 representing the second slot (the master-side second slot 26c, the slave-side second slot 38c), an icon image 103 representing the third slot (the master-side third slot 26d, the slave-side third slot 38d), and an icon image 104 representing an applet that has been already downloaded to the master portable communication device 20. In accordance with a tap operation, a flick operation, a swipe operation, and the like performed by the user on the touch panel constituting the input unit 23, when an operation of moving the icon image 104 of an optional applet is input to the slot represented by any of the icon images 101, 102, and 103, the control unit 27 sets the applet corresponding to the moved icon image 104 to the slot to which the icon image 104 is moved. Accordingly, the control unit 27 causes the master-side slot 26S optionally selected by the user to store the master applet optionally selected by the user. When the communication unit 22 and the communication unit 32 are caused to be in a communication enabled state as described above, the control unit 27 and the control unit 39 transfer the partial applet corresponding to the master applet optionally selected by the user to the slave-side slot 38S from each corresponding master-side slot 26S, and causes each slave-side slot 38S to store the partial applet. In this way, the user can optionally select the master applet to be stored in each master-side slot 26S and the partial applet to be transferred to each slave-side slot 38S.

By way of example, FIG. 5 exemplifies the selection screen 100 in a case of being able to optionally change the applet to be stored in the first slot, the second slot, and the third slot except the reference slot (the master-side reference slot 26a, the slave-side reference slot 38a) in which a specific applet (for example, a watch function applet) is stored in an initial state, but the embodiment is not limited thereto. The configuration may be made such that applets to be stored in all of the slots including the reference slot can be optionally changed. In this case, by allowing the applet stored in the reference slot to be changed under the condition that a specific operation input determined in advance is performed on the input unit 23 and consent of the user is confirmed, the control unit 27 can prevent the applet stored in the reference slot from being erroneously rewritten. In this case, for example, the selection screen 100 may be configured such that the icon image representing the reference slot is displayed in gray in the initial state, and is caused to be in the same display mode (active display) as that of the icon images 101, 102, and 103 of the other slots at the time when the specific operation input is performed on the input unit 23, consent of the user is confirmed, and the applet stored in the reference slot is caused to be in a changeable state.

<Switching Operation Unit of Starting Applet>

The slave portable communication device 30 can select the partial applet to be started and actually executed by the control unit 39 from among the partial applets stored in the slave-side slots 38S (the slave-side reference slot 38a, the slave-side first slot 38b, the slave-side second slot 38c, and the slave-side third slot 38d). In this case, the portable communication device cooperation system S1 can cause the input unit 23 of the master portable communication device 20 and the operation unit 35 of the slave portable communication device 30 to function as the switching operation unit for switching the partial applet executed by the slave portable communication device 30. The switching operation unit receives an operation of selecting and switching the partial applet to be started and executed by the control unit 39 among the partial applets stored in the respective slave-side slots 38S.

<Specific Example of Switching Operation Unit>

For example, in a case of causing the push button 8B of the operation unit 35 to function as the switching operation unit, the control unit 39 successively switches the slave-side slot 38S of the partial applet as a starting execution target in order of the slave-side reference slot 38a, the slave-side first slot 38b, the slave-side second slot 38c, and the slave-side third slot 38d each time a pressing-down operation is performed on the push button 8B. The control unit 39 then executes the partial applet of the slave-side slot 38S that is selected in accordance with the pressing-down operation on the push button 8B. At this point, the control unit 39 transmits a linked command to the master portable communication device 20 via the communication unit 32 in accordance with the operation. When the control unit 27 receives the linked command via the communication unit 22 and the like, the slot of the master-side slot 26S is selected while linking with selection of the partial applet of the slave-side slot 38S to start the applet of the corresponding slot. As a result, the slave portable communication device 30 can select the slave-side slot 38S for starting the partial applet with one action, so that convenience can be improved, and a frequent switching operation can be preferably performed, for example. In this case, by rotating the second hand 3a one round to stop at a predetermined position (for example, a position of a character expression 4e of "ACT" described later) at the time when the pressing-down operation is performed on the push button 8B, for example, the slave portable communication device 30 can notify the user that the slave-side slot 38S is switched. Thereafter, the second hand 3a operates in accordance with the partial applet stored in the selected slave-side slot 38S. In this case, the push button 8A of the operation unit 35 can be opened as a button that can be operated at the time when the partial applet of the selected slave-side slot 38S is executed.

<Display of Selected Slot by Register>

Figure 3:
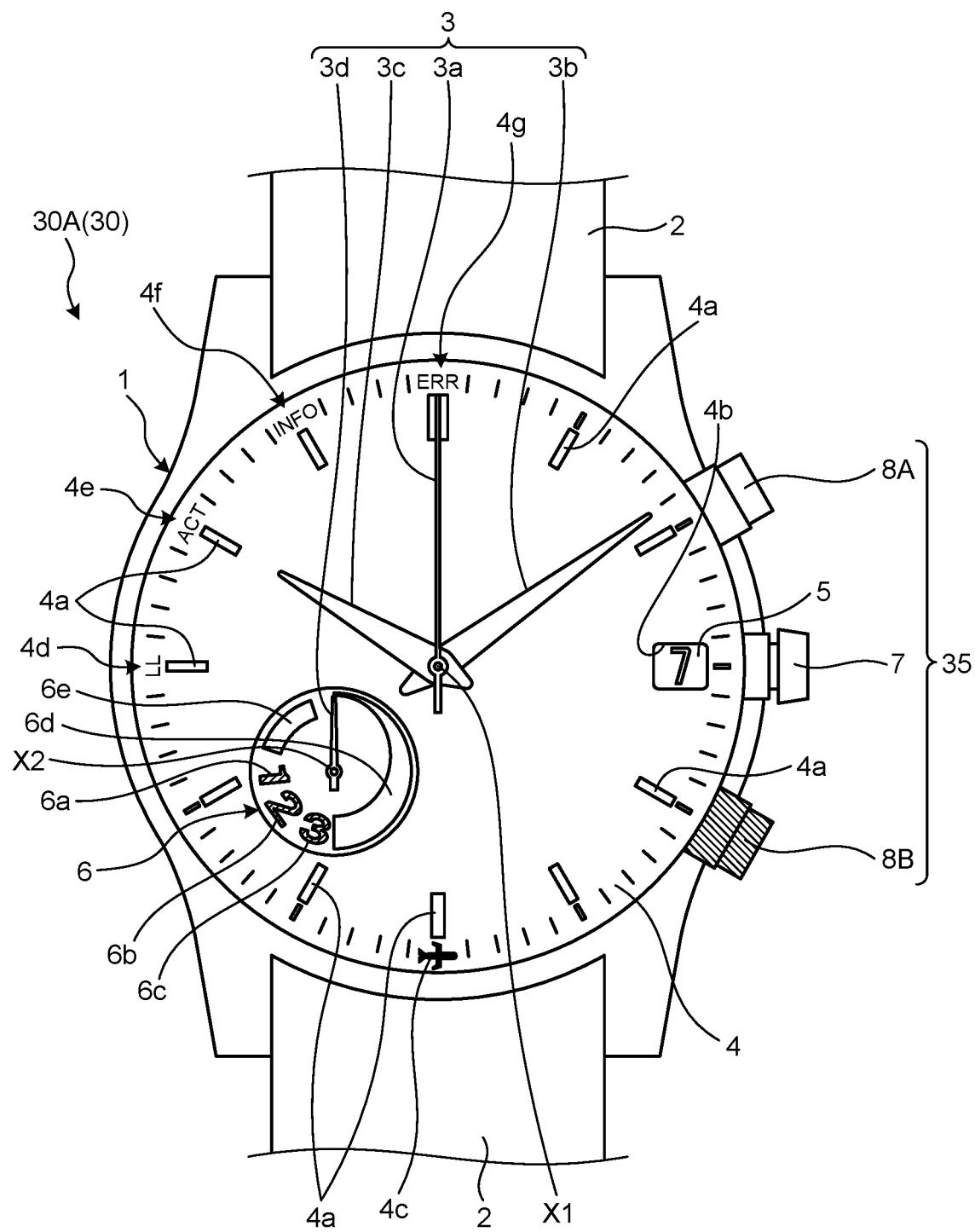
FIG. 3 is a front view illustrating an electronic watch constituting a slave portable communication device included in the portable communication device cooperation system according to the embodiment.

In switching the slave-side slot 38S as the starting execution target as described above, for example, the slave portable communication device 30 can display the slot of the partial applet that is currently selected by the register 6 (refer to FIG. 3). In the example of FIG. 3, a portion constituting the register 6 on the dial plate 4 includes a numerical expression 6a of "1", a numerical expression 6b of "2", a numerical expression 6c of "3", and a power level gauge 6d. The numerical expression 6a of "1" represents the slave-side first slot 38b. The numerical expression 6b of "2" represents the slave-side second slot 38c. The numerical expression 6c of "3" represents the slave-side third slot 38d. The power level gauge 6d represents a power storage amount of a battery. In a case in which the slave-side slot 38S that is currently selected is the slave-side first slot 38b, the register 6 indicates the numerical expression 6a of "1" by the small hand 3d. In a case in which the slave-side slot 38S that is currently selected is the slave-side second slot 38c, the register 6 indicates the numerical expression 6b of "2" by the small hand 3d. In a case in which the slave-side slot 38S that is currently selected is the slave-side third slot 38d, the register 6 indicates the numerical expression 6c of "3" by the small hand 3d. Herein, in a case in which the slave-side slot 38S that is currently selected is the slave-side reference slot 38a, the register 6 indicates a predetermined position of the power level gauge 6d (a position corresponding to the power storage amount of the battery) by the small hand 3d to represent that the slave-side reference slot 38a is currently selected. Due to this, the slave portable communication device 30 can cause the user to easily recognize the slave-side slot 38S that is currently selected.

<Additional Items Related to Switching Operation Unit>

In the slave portable communication device 30 exemplified in FIG. 3, the register 6 is disposed on an eight o'clock position side between a four o'clock position and the eight o'clock position on the dial plate 4, and the push button 8B is disposed on the four o'clock position side between the four o'clock position and the eight o'clock position on the dial plate 4. Due to this configuration, in the slave portable communication device 30, the register 6 that displays the selected slave-side slot 38S and the push button 8B functioning as the switching operation unit for switching the slave-side slot 38S can be closely disposed side by side in a horizontal direction (a direction along a line connecting a three o'clock position and a nine o'clock position on the dial plate 4). As a result, the slave portable communication device 30 can cause the user to intuitively and clearly recognize that the register 6 and the push button 8B correlate with each other in switching the slave-side slot 38S. Furthermore, for example, as illustrated in FIG. 3, by matching expression colors of the numerical expression 6a of "1", the numerical expression 6b of "2", the numerical expression 6c of "3", the power level gauge 6d, the small hand 3d, and the like in the register 6 with colors of the push button 8B functioning as the switching operation unit and a bezel in the vicinity of the push button 8B, the slave portable communication device 30 can cause the user to recognize the correlation therebetween more intuitively.

As an example different from the above example, in a case in which the register 6 is disposed between a ten o'clock position and a two o'clock position on the dial plate 4, by selecting the push button SA that is disposed side by side closely thereto in the horizontal direction as the push button functioning as the switching operation unit for selecting the function displayed by the register 6, for example, for switching selection of the slave-side slot 38S, the user is enabled to intuitively recognize the correlation therebetween. By causing the expression colors of the functions of the register 6 that can be switched by operating the push button to be the same as the color of the push button and the expression colors of marks written on the bezel in the vicinity thereof irrespective of a positional relation between the register 6 and the push button, a high effect can be obtained to cause the user to recognize the correlation therebetween.

<Other Specific Examples of Switching Operation Unit>

The slave portable communication device 30 can also cause the crown 7 to function as the switching operation unit in place of the push button 8B of the operation unit 35. In this case, for example, in a state in which the crown 7 is at a 0 step (in a state of not being pulled out), the control unit 39 may successively switch the slave-side slot 38S of the partial applet as the starting execution target in order of the slave-side reference slot 38a, the slave-side first slot 38b, the slave-side second slot 38c, and the slave-side third slot 38d each time the crown 7 is operated to rotate in one direction. Also in this case, the slave portable communication device 30 can select the slave-side slot 38S for starting the partial applet with one action, so that convenience can be improved, and a frequent switching operation can be preferably performed, for example. The switching operation unit can also include the input unit 23 of the master portable communication device 20. In this case, for example, the control unit 27 may cause the display constituting the output unit 25 to display a selection screen for selecting the slave-side slot 38S, and switch the slave-side slot 38S of the partial applet as the starting execution target in accordance with an operation input to the touch panel constituting the input unit 23.

Working Effect of Embodiment

The portable communication device cooperation system 31 described above includes the master portable communication device 20 and the slave portable communication device 30 that can communicate with each other via the communication unit 22 and the communication unit 32. The master portable communication device 20 stores the master applet in each of the master-side slots 26S of the storage unit 26. Each master applet causes the master portable communication device 20 and the slave portable communication device 30 to operate in cooperation with each other by being executed by the control unit 27 and the control unit 39. The slave portable communication device 30 then stores the partial applet that is transferred from the corresponding master-side slot 26S via the communication unit 22 and the communication unit 32 in each of the slave-side slots 38S of the storage unit 38. Each partial applet constitutes part of the corresponding master applet, and is executed by the control unit 39 to cause the slave portable communication device 30 to operate. As a result, the portable communication device cooperation system S1, the master portable communication device 20, and the slave portable communication device 30 can enable the slave portable communication device 30 to be variously used. That is, when the partial applet stored in each of the slave-side slots 38S of the storage unit 38 is executed, the slave portable communication device 30 can cooperate with the master portable communication device 20 to implement various functions and operations with one slave portable communication device 30.

With the portable communication device cooperation system S1 described above, the user can optionally select the partial applet to be started and actually executed by the control unit 39 from among the partial applets stored in the slave-side slots 38S in the slave portable communication device 30 via the switching operation unit (the input unit 23 of the master portable communication device 20 and the operation unit 35 of the slave portable communication device 30). As a result, the portable communication device cooperation system S, the master portable communication device 20, and the slave portable communication device 30 can improve convenience of the slave portable communication device 30.

The portable communication device cooperation system S1, the master portable communication device 20, and the slave portable communication device 30 described above can handle the slave-side reference slot 38a among the slave-side slots 38S to be distinguished from the other slave-side slots 38S in the slave portable communication device 30, so that the partial applet stored in the slave-side reference slot 38a can be used in a specific mode different from that of the partial applets stored in the other slave-side slots 38S.

With the portable communication device cooperation system S1, the master portable communication device 20, and the slave portable communication device 30 described above, the partial applet for causing the slave portable communication device 30 to display a time may be previously stored in the slave-side reference slot 38a, and various functions and operations other than the watch can be implemented by the partial applets of the other slave-side slots 38S while causing the slave portable communication device 30 to operate as the watch as the basic function.

With the portable communication device cooperation system S1, the master portable communication device 20, and the slave portable communication device 30 described above, the slave portable communication device 30 is configured by a wearable device, so that various services that improve the life of the user can be provided in cooperation with the master portable communication device 20 in a state in which the user wears the slave portable communication device 30.

The slave portable communication device 30 is the analog electronic watch 30A that displays a time by the indicator 3, so that the portable communication device cooperation system S1, the master portable communication device 20, and the slave portable communication device 30 described above can effectively use the indicator 3, the dial plate 4, and the like at the same time to provide various services other than time display in cooperation with the master portable communication device 20.

With the portable communication device cooperation system S1, the master portable communication device 20, and the slave portable communication device 30 described above, the partial applet including part of the information of each master applet that is downloaded to the master portable communication device 20 from the external device 10 is transferred to the slave portable communication device 30 to be executed by the slave portable communication device 30, so that the slave portable communication device 30 is enabled to be used more variously in cooperation with the external device 10.

With the portable communication device cooperation system S1, the master portable communication device 20, and the slave portable communication device 30 described above, the master applet includes the service block, the trigger block, and the action block, and the partial applet includes at least part of the service block, the trigger block, or the action block. With this configuration, the portable communication device cooperation system S1, the master portable communication device 20, and the slave portable communication device 30 can cause the master portable communication device 20 to cooperate with the slave portable communication device 30, and cause the action execution unit to execute an action corresponding to the service content in accordance with the trigger generated by the trigger generation unit.

<Additional Item 1: Automatic Change of Applet>

The control unit 27 and the control unit 39 described above can perform control to switch a combination of the master applets to be stored in the master-side slots 26S and a combination of the partial applets to be stored in the slave-side slots 38S in accordance with a switching condition set in advance. For example, by using the selection screen 100 and the like described above with reference to FIG. 5, the control unit 27 previously groups combinations of applets to be stored in the respective slots in accordance with an input from the user, sets a plurality of groups, and previously sets switching conditions for the respective groups. Examples of the switching conditions for the respective groups include the fact that a time designated by the user is reached, and the fact that an action designated by the user (an action that can be detected by the detection unit 36 such as the number of steps) is detected. When the switching condition is established, the control unit 27 and the control unit 39 automatically switches the combination of the applets stored in each slot to another combination. Also in this case, the partial applet is automatically transferred to each of the slave-side slots 38S from each of the master-side slots 26S via the communication unit 22 and the communication unit 32. With this configuration, the portable communication device cooperation system S1 can automatically switch the applet stored in each slot in the slave portable communication device 30 in accordance with needs, a life style, a life rhythm, and the like of the user, so that convenience can be further improved.

<Additional Item 2: Automatic Return to Reference Slot (Default Setting of Slave-Side Slot)>

For example, in a case in which the operation by the other partial applet ends or a case in which an intention to select the slave-side slot 38S of the user cannot be grasped, the control unit 39 described above may perform control to preferentially select the slave-side reference slot 38a and preferentially start and execute the partial applet stored in the slave-side reference slot 38a. More specifically, for example, in cases such as (1), (2), (3), (4), (5), or (6) described below, the control unit 39 can perform control to preferentially select the slave-side reference slot 38a as the slave-side slot 38S of the partial applet as the starting execution target.

(1) A case in which an operation corresponding to the partial applet stored in the other slave-side slot 38S other than the slave-side reference slot 38a ends (2) A case in which any partial applet is not executed by the control unit 39

(3) A case in which communication with the outside (master portable communication device 20) via the communication unit 32 is disabled (4) A case of return from the state in which communication with the outside (master portable communication device 20) via the communication unit 32 is disabled (5) A case in which the partial applet is not stored in the other slave-side slot 38S other than the slave-side reference slot 38a (6) A case in which electric power of the power supply of the slave portable communication device 30 becomes equal to or smaller than a threshold set in advance In other words, the control unit 39 sets the slave-side reference slot 38a as a default slot, the slave-side reference slot 38a is automatically selected by the control unit 39 in cases such as (1), (2), (3), (4), (5), or (6) described above, and the partial applet stored in the slave-side reference slot 38a is automatically executed. With this configuration, in a state in which the partial applet stored in the other slave-side slot 38S other than the slave-side reference slot 38a is not executed in the slave portable communication device 30, for example, the portable communication device cooperation system S1 can execute the partial applet stored in the slave-side reference slot 38a, that is, the partial applet for causing the slave portable communication device 30 to function as a watch in this case to cause the slave portable communication device 30 to function as a watch.

<Additional Item 3: Prevention of Misoperation of Switching Operation Unit>

In the above description, in a case of causing the push button 8B of the operation unit 35 to function as the switching operation unit, the control unit 39 is assumed to successively switch the slave-side slot 38S of the partial applet as the starting execution target each time a pressing-down operation is performed on the push button 8B. On the other hand, instead of successively switching the slave-side slot 38S each time a pressing-down operation is simply performed on the push button 8B, the control unit 39 can perform control to successively switch the slave-side slot 38S at the time when a rotation operation is performed on the crown 7 within a predetermined time (for example, about 5 seconds) after a pressing-down operation is performed on the push button 8B. Due to this, the control unit 39 can prevent a misoperation on the switching operation unit by the user. As a further example, the control unit 39 can perform control to switch the first slave-side slot 38S at the time when the push button 8B is pressed and held for a predetermined time (for example, about 2 seconds), and successively switch the slave-side slot 38S each time the push button 8B is shortly pressed thereafter. Also in this case, the control unit 39 can prevent a misoperation on the switching operation unit by the user.

<Additional Item 4-1: Other Functions of Crown (Flight Mode)>

Figure 6:
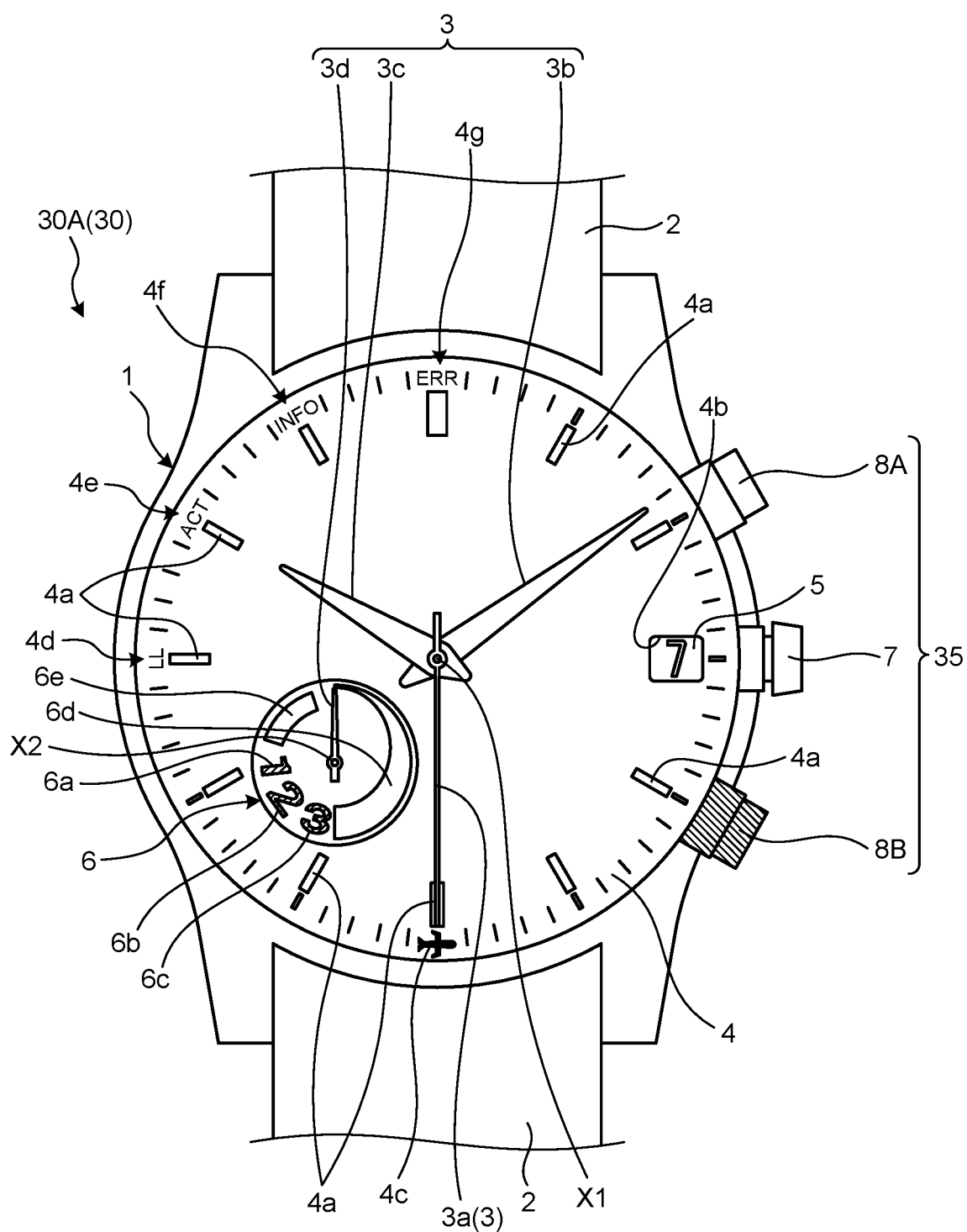
FIG. 6 is a front view illustrating an example of a selection display mode of a flight mode of the slave portable communication device (electronic watch) included in the portable communication device cooperation system according to the embodiment.

The slave portable communication device 30 described above can select a flight mode in which communication via the communication unit 32 is interrupted and disabled when the crown 7 is pulled out by one step to be in a one-step pulled out state and a predetermined rotation operation is performed thereafter. In this case, the slave portable communication device 30 can select an ON/OFF setting of the flight mode when the crown 7 is caused to be in the one-step pulled out state and the rotation operation is performed, and can display a result thereof by the second hand 3a (at this point, the slave portable communication device 30 continuously displays a time with the minute hand 3b and the hour hand 3c). For example, the slave portable communication device 30 represents that flight mode OFF is selected by the second hand 3a indicating a twelve o'clock position opposite to a position of an airplane symbol 4c disposed at a six o'clock position on the dial plate 4 as illustrated in FIG. 3. On the other hand, the slave portable communication device 30 represents that flight mode ON is selected by the second hand 3a indicating the airplane symbol 4c as illustrated in FIG. 6. In this case, by representing that "flight mode OFF" is selected by the second hand 3a indicating the twelve o'clock position opposite to the airplane symbol 4c, the slave portable communication device 30 can simulate a state of radiating radio waves toward the outside of an airplane, so that the user is enabled to easily image that "flight mode OFF" is selected. On the other hand, by representing that "flight mode ON" is selected by the second hand 3a indicating the airplane symbol 4c disposed at the six o'clock position, the slave portable communication device 30 can simulate a state of keeping radio waves inside the airplane, so that the user is enabled to easily image that "flight mode ON" is selected. When the crown 7 is pressed back in a state in which "flight mode ON" is selected, the slave portable communication device 30 can actually proceeds to the flight mode. Even in a case in which the airplane symbol 4c is not written, a human body is present on the six o'clock position side of the dial plate 4 and the twelve o'clock position side is an open region without an obstacle when the electronic watch 30A is put on an arm and the dial plate 4 is directed toward an upward direction, so that the user can advantageously image that radio waves are closed in a case in which the indicator 3 (second hand 3a) indicates the six o'clock position direction, and radio waves are opened in a case in which the indicator indicates the twelve o'clock position direction. The respective operations described above are performed by being controlled by the control unit 39. In the flight mode, the control unit 39 may temporarily stop execution of the partial applet, or may automatically select the slave-side reference slot 38a and automatically start and execute the partial applet stored in the slave-side reference slot 38a as described above.

<Additional Item 4-2: Other Functions of Crown (Time Adjustment, Reference Position Confirmation Mode, and the Like)>

Furthermore, when the crown 7 is pulled out by two steps to be in a two-step pulled out state, the second hand 3a is stopped at the three o'clock position and the slave portable communication device 30 can proceeds to a time adjustment mode. With the slave portable communication device 30, the time is enabled to be corrected when the push button 8B is pressed and held for a predetermined time (for example, about 5 seconds) in this state, and the positions of the minute hand 3b and the hour hand 3c are enabled to be adjusted when a rotation operation is performed on the crown 7 in this state. Furthermore, when the push button 8A is pressed and held for a predetermined time (for example, about 5 seconds) in this state, the slave portable communication device 30 can proceed to a reference position confirmation mode for the indicator 3. In the reference position confirmation mode, the slave portable communication device 30 causes each of the indicators 3 (the second hand 3a, the minute hand 3b, the hour hand 3c, and the small hand 3d) to move to a reference position determined in advance (for example, the twelve o'clock position). The slave portable communication device 30 can be configured such that the indicator 3 the reference position of which is to be adjusted is selected by a pressing-down operation on the push button 8A or the push button 8B in a case in which an actual position and the reference position of each indicator 3 are shifted from each other in this state, and the reference position of the selected indicator 3 is enabled to be adjusted when a rotation operation is performed on the crown 7 in this state. The respective operations described above are performed by being controlled by the control unit 39. When the crown 7 is pressed back from the two-step pulled out state to be in a zero-step state, the slave portable communication device 30 returns to normal time display. In this case, the control unit 39 may temporarily stop execution of the partial applet in a state in which the crown 7 is pulled out by two steps. When the crown 7 is pressed back from the two-step pulled out state to be in the zero-step state, the control unit 39 may restart execution of the partial applet of the slave-side slot 38S that has been selected before the crown 7 is pulled out, or may automatically select the slave-side reference slot 38a and automatically start and execute the partial applet stored in the slave-side reference slot 38a as described above. When the push button 8A and the push button 8B are pressed and held for a predetermined time (for example, about 7 seconds) at the same time, the slave portable communication device 30 may start soft rest to completely initialize (all reset) the time information.

<Additional Item 4-3: Other Functions of Crown (Communication Function Reset)>

When the push button 8A is pressed and held for a predetermined time (for example, about 12 seconds) after the crown 7 is caused to be in the one-step pulled out state, the slave portable communication device 30 may perform hardware reset of a communication IC related to the communication unit 32 in the slave portable communication device 30 to be initialized. When the push button 8B is pressed and held for a predetermined time (for example, about 5 seconds) after the crown 7 is caused to be in the one-step pulled out state, the slave portable communication device 30 may delete authentication information of a pairing key and the like related to communication with the master portable communication device 20. The respective operations described above are performed by being controlled by the control unit 39.

<Additional Item 5: Other Functions of Register (Various State Reports)>

In the register 6 described above (refer to FIG. 3), an alert notification display (ALT) gauge 6e is further provided in the portion constituting the register 6 on the dial plate 4 in addition to the numerical expressions 6a, 6b, and 6c, and the power level gauge 6d. Herein, the ALT gauge 6e is disposed between the numerical expression 6a of "1" and the power level gauge 6d. On the dial plate 4 described above (refer to FIG. 3), a character expression 4d of "LL" representing "LINK LOSS", a character expression 4e of "ACT" representing "ACTIVE", a character expression 4f of "INFO" representing "INFORMATION", and a character expression 4g of "ERR" representing "ERROR" are provided. Herein, the character expression 4d of "LL" is disposed at the nine o'clock position on the dial plate 4, the character expression 4e of "ACT" is disposed at the ten o'clock position on the dial plate 4, the character expression 4f of "INFO" is disposed at an eleven o'clock position on the dial plate 4, and the character expression 4g of "ERR" is disposed at the twelve o'clock position on the dial plate 4. The slave portable communication device 30 (electronic watch 30A) can report (alert) various states of the slave portable communication device 30 by combining the ALT gauge 6e, the character expression 4d of "LL", the character expression 4e of "ACT", the character expression 4f of "INFO", the character expression 4g of "ERR", the second hand 3a, and the small hand 3d. The character expressions 4d, 4e, 4f, and 4g of "LL", "ACT", "INFO", and "ERR" are not limited thereto, and may be respectively disposed at the three o'clock position, the six o'clock position, the nine o'clock position, and the twelve o'clock position, for example. In this case, the character expressions 4d, 4e, 4f, and 4g are distant from each other by 45 degrees, so that the position indicated by the indicator 3 (second hand 3a) can be easily determined from a distant place.

For example, when the small hand 3d indicates the ALT gauge 6e and the second hand 3a indicates the character expression 4d of "LL", the slave portable communication device 30 can report that communication with the master portable communication device 20 via the communication unit 32 is in a disconnected state. When the small hand 3d indicates the ALT gauge 6e and the second hand 3a indicates the character expression 4e of "ACT", the slave portable communication device 30 can report that communication with the master portable communication device 20 via the communication unit 32 is being prepared, or in a busy state. When the small hand 3d indicates the ALT gauge 6e and the second hand 3a indicates the character expression 4f of "INFO", the slave portable communication device 30 can report that there is a notification from the master applet on the master portable communication device 20 side. When the small hand 3d indicates the ALT gauge 6e and the second hand 3a indicates the character expression 4g of "ERR", the slave portable communication device 30 can report that an error is caused and the partial applet is not executed. Due to this, the slave portable communication device 30 can easily report a current operating state of the slave portable communication device 30 to the user. When a pressing-down operation is performed on any of the push buttons 8A and 8B, the slave portable communication device 30 can cancel the report (alert) of the various states. The respective operations described above are performed by being controlled by the control unit 39.

The portable communication device cooperation system S1 may also cause the display constituting the output unit 25 on the master portable communication device 20 side to display similar various state reports in addition to the various state reports using the register 6 as described above. In this case, for example, by displaying images imitating the dial plate 4, the register 6, the second hand 3*a*, the small hand 3*d*, and the like on the display, and displaying these elements in a positional relation similar to that of display on the slave portable communication device 30, the master portable communication device 20 can cause the user to recognize the current operating state of the slave portable communication device 30 more easily. Alternatively, in a case in which an error, a warning, and the like are caused on the slave portable communication device 30 side, the portable communication device cooperation system S1 may urge the user to see the master portable communication device 20 by the small hand 3*d* indicating the ALT gauge 6*e*, while causing the display constituting the output unit 25 on the master portable communication device 20 side to display a message representing the state of the slave portable communication device 30. As the message representing the state of the slave portable communication device 30, exemplified are "remaining battery power of the watch is insufficient", "hand position shift needs to be checked because an impact is applied", "a function for which an alarm is set cannot be executed", and the like, but the embodiment is not limited thereto.

<Additional Item 6: Communication Connection Between Master Portable Communication Device and Slave Portable Communication Device>

When a pressing-down operation is performed on the push button 8A and the push button 8B at the same time, for example, the slave portable communication device 30 can proceed to communication connection with the master portable communication device 20. In this case, the control unit 39 establishes short-range wireless communication with the master portable communication device 20 via the communication unit 32 while the second hand 3*a* indicates the character expression 4*e* of "ACT". When the short-range wireless communication with the master portable communication device 20 succeeded, the control unit 39 rotates the second hand 3*a* two rounds to return to time display, for example. On the other hand, when the short-range wireless communication with the master portable communication device 20 failed, the control unit 39 causes the second hand 3*a* to indicate the character expression 4*d* of "LL", for example. As a result, the slave portable communication device 30 can notify the user of success or failure in establishment of the short-range wireless communication with the master portable communication device 20, so that convenience can be further improved.

The portable communication device cooperation system, the master portable communication device, and the slave portable communication device according to the embodiment of the present invention described above are not limited to the embodiment described above, and can be variously modified within the scope of CLAIMS.

In the above description, the slave portable communication device 30 is assumed to include the electronic watch 30A as illustrated in FIG. 3 as an example of a wearable device, but the embodiment is not limited thereto. The slave portable communication device 30 may also include another wearable device such as a spectacle type, a ring type, a shoes type, or a pendant type. Furthermore, the slave portable communication device 30 is not necessarily the wearable device, and may include a portable game machine and the like having a communication function, for example. Alternatively, the portable communication device cooperation system S1 may include a plurality of the slave portable communication devices 30, and the slave portable communication devices 30 may cooperate with one master portable communication device 20.

In the above description, the master applets stored in the master-side slots 26S may include a master applet the trigger and the action of which is completed only by the master portable communication device 20 side, that is, a master applet that is not required to transfer a partial applet to the slave portable communication device 30 side.

The master-side slots 26S described above do not necessarily include the master-side reference slot 26*a*, and may include a master-side fourth slot equivalent (having an equivalent rank) to the master-side first slot 26*b*, the master-side second slot 26*c*, and the master-side third slot 26*d* in place of the master-side reference slot 26*a*. Similarly, the slave-side slots 38S do not necessarily include the slave-side reference slot 38*a* described above, and may include a slave-side fourth slot equivalent (having an equivalent rank) to the slave-side first slot 38*b*, the slave-side second slot 38*c*, and the slave-side third slot 38*d* in place of the slave-side reference slot 38*a*.

The master application program and the slave application program have been described above as what is called applets, but the embodiment is not limited thereto. In the above description, the master application program (master applet) is assumed to include the service block program, the trigger block program, and the action block program, but the embodiment is not limited thereto.

<Modification of Applet Selection Screen>

Figure 7:
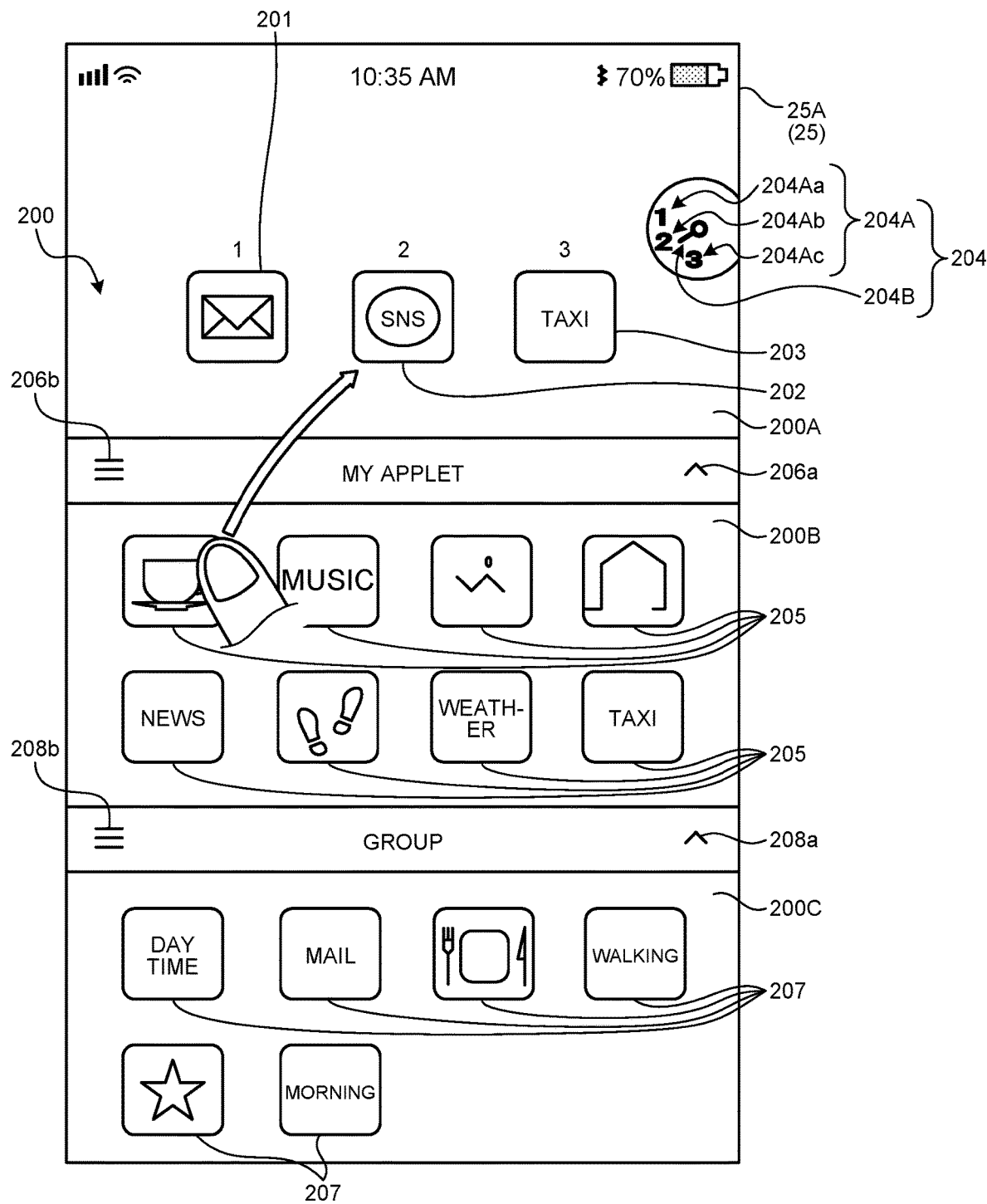
FIG. 7 is a schematic diagram illustrating an example of a selection screen for applets of a portable communication device cooperation system according to a modification.

In a case of causing the applet (the master applet, the partial applet) that is set to each slot (the master-side slot 26S, the slave-side slot 38S) to be selected, the control unit 27 may cause the display 25A to display a selection screen 200 illustrated in FIG. 7 in place of the selection screen 100 illustrated in FIG. 5 described above. The display 25A constitutes a display unit that is controlled by the control unit 27 and can display an image. The selection screen 200 illustrated in FIG. 7 includes a slot display region 200A, a my applet region 200B, and a set applet region 200C. In the selection screen 200, the slot display region 200A is positioned on an upper side, the my applet region 200B is positioned in the middle, and the set applet region 200C is positioned on a lower side.

The slot display region 200A is a region that displays the applet set to each slot, and is operated for setting the applet to each slot. In the slot display region 200A, slot icon images 201, 202, and 203, a selected slot image 204, and the like are displayed.

The slot icon image 201 is an icon image representing the first slot (the master-side first slot 26*b*, the slave-side first slot 38*b*). The slot icon image 202 is an icon image representing the second slot (the master-side second slot 26*c*, the slave-side second slot 38*c*). The slot icon image 203 is an icon image representing the third slot (the master-side third slot 26*d*, the slave-side third slot 38*d*).

The selected slot image 204 is an image representing the slave-side slot 38S that stores the partial applet that is currently selected as the partial applet executed by the control unit 39 among the partial applets stored in the respective slave-side slots 38S.

As described above, for example, the portable communication device cooperation system S1 can select and switch the partial applet to be started and executed by the control unit 39 among the partial applets stored in the respective slave-side slots 38S via the input unit 23 of the master portable communication device 20 and the operation unit 35 of the slave portable communication device 30, and can select the slot of the master-side slot 26S to start the applet of the corresponding slot while linking with selection of the partial applet of the slave-side slot 38S. In other words, the selected slot image 204 corresponds to an image representing the slot that is selected as described above (the slave-side slot 38S, the master-side slot 26S).

By way of example, the selected slot image 204 illustrated in FIG. 7 includes a slot image 204A representing the slave-side slot 38S other than the slave-side reference slot 38a among the slave-side slots 38S, and an indicator image 204B representing an indicator that rotates about a rotation axis. A plurality of the slot images 204A are displayed corresponding to the number of the slave-side slots 38S other than the slave-side reference slot 38a. Herein, the slot images 204A include a first slot image 204Aa, a second slot image 204Ab, and a third slot image 204Ac respectively corresponding to the three slots, that is, the slave-side first slot 38b, the slave-side second slot 38c, and the slave-side third slot 38d. The first slot image 204Aa is an image representing the slave-side first slot 38b, and is a character image of "1" by way of example. The second slot image 204Ab is an image representing the slave-side second slot 38c, and is a character image of "2" by way of example. The third slot image 204Ac is an image representing the slave-side third slot 38d, and is a character image of "3" by way of example. The first slot image 204Aa, the second slot image 204Ab, and the third slot image 204Ac are positioned side by side at intervals along a locus on a circular arc centered on the rotation axis of the indicator represented by the indicator image 204B. Typically, the selected slot image 204 can represent the slot that is currently selected by indicating the slot image 204A (the first slot image 204Aa, the second slot image 204Ab, the third slot image 204Ac) by the indicator image 204B.

Typically, in a case in which the slave-side slot 38S that stores the currently selected partial applet is the slave-side slot 38S other than the slave-side reference slot 38a, the control unit 27 causes the display 25A to display the selected slot image 204, and causes the indicator image 204B to indicate the corresponding slot image 204A as illustrated in FIG. 7. That is, in a case in which the currently selected slot is the slave-side second slot 38c and the master-side second slot 26c, the control unit 27 causes the indicator image 204B to indicate the second slot image 204Ab as illustrated in FIG. 7. Similarly, in a case in which the currently selected slot is the slave-side first slot 38b and the master-side first slot 26b, the control unit 27 causes the indicator image 204B to indicate the first slot image 204Aa. In a case in which the currently selected slot is the slave-side third slot 38d and the master-side third slot 26d, the control unit 27 causes the indicator image 204B to indicate the third slot image 204Ac.

Figure 8:
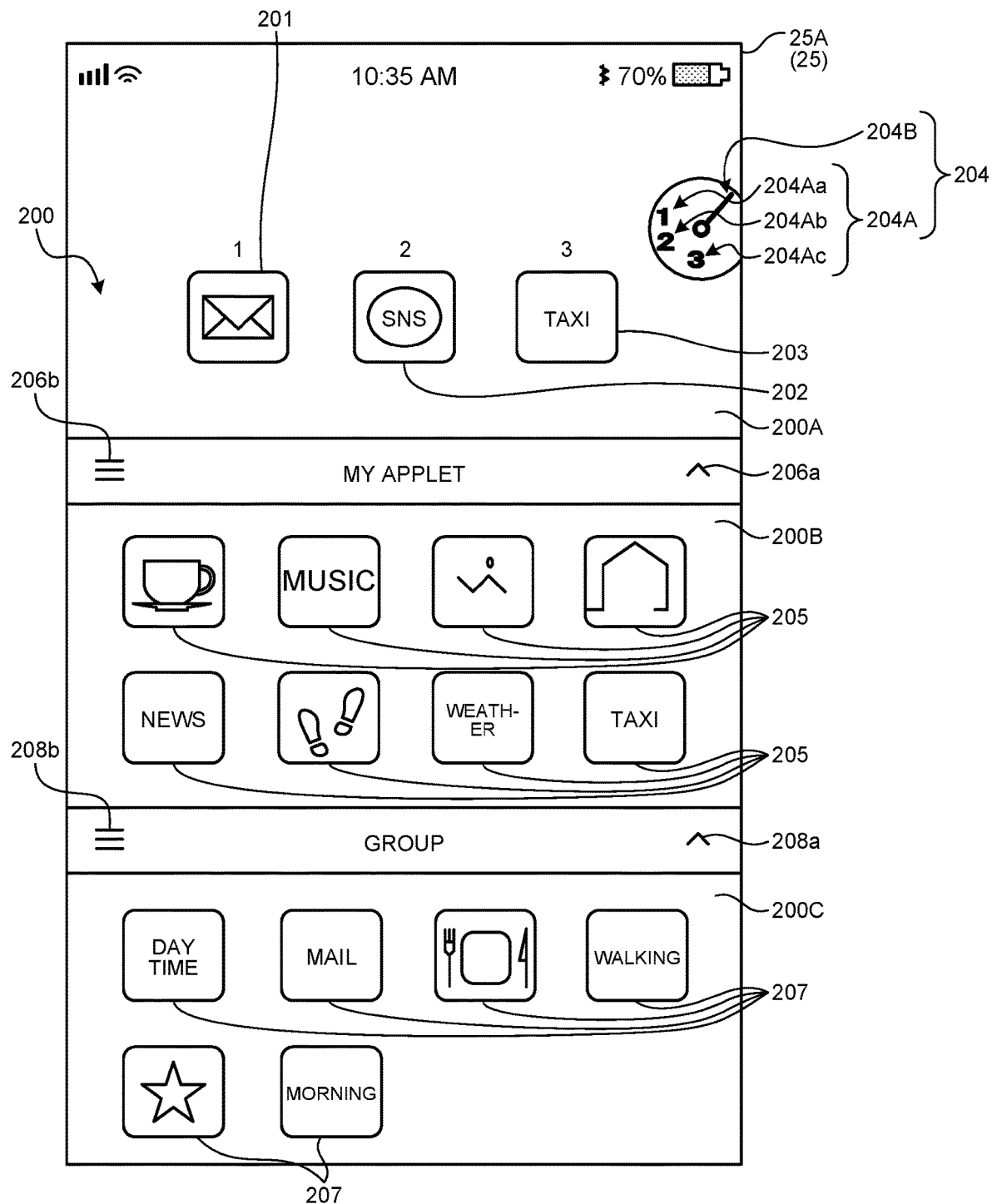
FIG. 8 is a schematic diagram illustrating an example of the selection screen for applets of the portable communication device cooperation system according to the modification.

On the other hand, in a case in which the slave-side slot 38S that stores the currently selected partial applet is the slave-side reference slot 38a, the control unit 27 causes the display 25A to display the selected slot image 204, and causes the indicator image 204B to indicate a position other than the slot image 204A as illustrated in FIG. 8. In the example of FIG. 8, in a case in which the currently selected slot is the slave-side reference slot 38a and the master-side reference slot 26a, the control unit 27 causes the indicator image 204B to indicate the opposite side of the second slot image 204Ab.

As a result, the portable communication device cooperation system S1, the master portable communication device 20, and the slave portable communication device 30 can clearly display the currently selected slot by the selected slot image 204 in the master portable communication device 20.

Subsequently, the my applet region 200B is a region that displays the applet that can be set to each slot, and is operated for setting the applet to each slot. In the my applet region 200B, an applet icon image 205 and the like representing the applet that can be set to each slot are displayed together with a character image of "My Applet". The applet that can be set to each slot is, for example, an applet that has been already downloaded to the master portable communication device 20, an applet that is created by itself (the master portable communication device 20), an applet that is stored in the master portable communication device 20 by default, and the like. For example, the control unit 27 can switch folded display/unfolded display of the my applet region 200B in accordance with a tap operation on an arrow image 206a in the my applet region 200B. The control unit 27 can also perform an operation of creating and arranging folders for organizing a plurality of the applet icon images 205 in accordance with a tap operation on a menu image 206b in the my applet region 200B.

The set applet region 200C is a region that displays applet groups that can be collectively set to a plurality of the slots, and is operated for setting the applet to each slot. In the set applet region 200C, a group icon image 207 and the like representing the applet group that can be collectively set to a plurality of the slots are displayed together with a character image of "GROUP". The applet group that can be collectively set to a plurality of (in this case, three) slots is a group collectively determining a combination of master applets and partial applets to be stored in the master-side slots 26S and the slave-side slots 38S, which is obtained by grouping a plurality of specific applets that are optionally selected by the user. For example, the control unit 27 previously groups a combination of a plurality of (in this case, three) applets as an applet group in accordance with an input from the user, and sets the group icon image 207 corresponding thereto in accordance with an input from the user. In the set applet region 200C, the group icon image 207 of the applet group that is grouped as described above is displayed. For example, the control unit 27 can switch folded display/ unfolded display of the set applet region 200C in accordance with a tap operation on an arrow image 208a in the set applet region 200C. For example, the control unit 27 can also perform an operation of creating and arranging the applet group in accordance with a tap operation on a menu image 208b in the my applet region 200B.

The control unit 27 sets the applet to each slot when the slot display region 200A, the my applet region 200B, and the set applet region 200C are operated in accordance with a tap operation, a flick operation, a swipe operation, and the like performed by the user on the touch panel constituting the input unit 23. For example, when an operation of moving the applet icon image 205 of an optional applet in the my applet region 200B to the slot represented by any of the slot icon images 201, 202, and 203 in the slot display region 200A is input (for example, refer to an arrow in FIG. 7), the control unit 27 sets the applet corresponding to the moved applet icon image 205 to the slot. For example, the control unit 27 automatically moves the applet icon images 205 of the applets included in the applet group to the respective slot icon images 201, 202, and 203 in accordance with a tap operation on the group icon image 207 of an optional applet group in the set applet region 200C, and collectively sets the applets corresponding to the applet icon images 205 to each slot.

In this way, the portable communication device cooperation system S1, the master portable communication device 20, and the slave portable communication device 30 can set the applets (the master applet, the partial applet) optionally selected by the user to each slot (the master-side slot 26S, the slave-side slot 38S) via the selection screen 200.

<Additional Item 1 of Modification: Applet Setting in Communication Disabled State>

The control unit 27 can execute applet setting for each slot as described above even in a state in which the master portable communication device 20 and the slave portable communication device 30 are disabled from communicating with each other via the communication unit 22 and the communication unit 32. In this case, in a case in which the applet is set to the slot as described above and the master applet is stored in the master-side slot 26S in a state in which the master portable communication device 20 and the slave portable communication device 30 are disabled from communicating with each other via the communication unit 22 and the communication unit 32, when the master portable communication device 20 and the slave portable communication device 30 are enabled to communicate with each other via the communication unit 22 and the communication unit 32, the control unit 27 may collectively transmit, to the slave portable communication device 30, the partial applets corresponding to the master applets that are stored in the master-side slots 26S in a communication disabled state. As a result, even in a state in which the master portable communication device 20 and the slave portable communication device 30 are disabled from communicating with each other, the portable communication device cooperation system S1, the master portable communication device 20, and the slave portable communication device 30 can set the applet (the master applet, the partial applet) optionally selected by the user to each slot (the master-side slot 26S, the slave-side slot 38S).

In a case in which the applet is set to the slot as described above and the master applet is stored in the master-side slot 26S in a state in which the master portable communication device 20 and the slave portable communication device 30 are enabled to communicate with each other via the communication unit 22 and the communication unit 32, the control unit 27 may transmit the partial applet corresponding to the stored master applet to the slave portable communication device 30 as the occasion demands, or may collectively transmit the partial applets corresponding to the master applets to the slave portable communication device 30 at the time when all the master applets are stored in a plurality of (in this case, three) the master-side slots 26S.

<Additional Item 2 of Modification: Display of Communication State 1>

Figure 9:
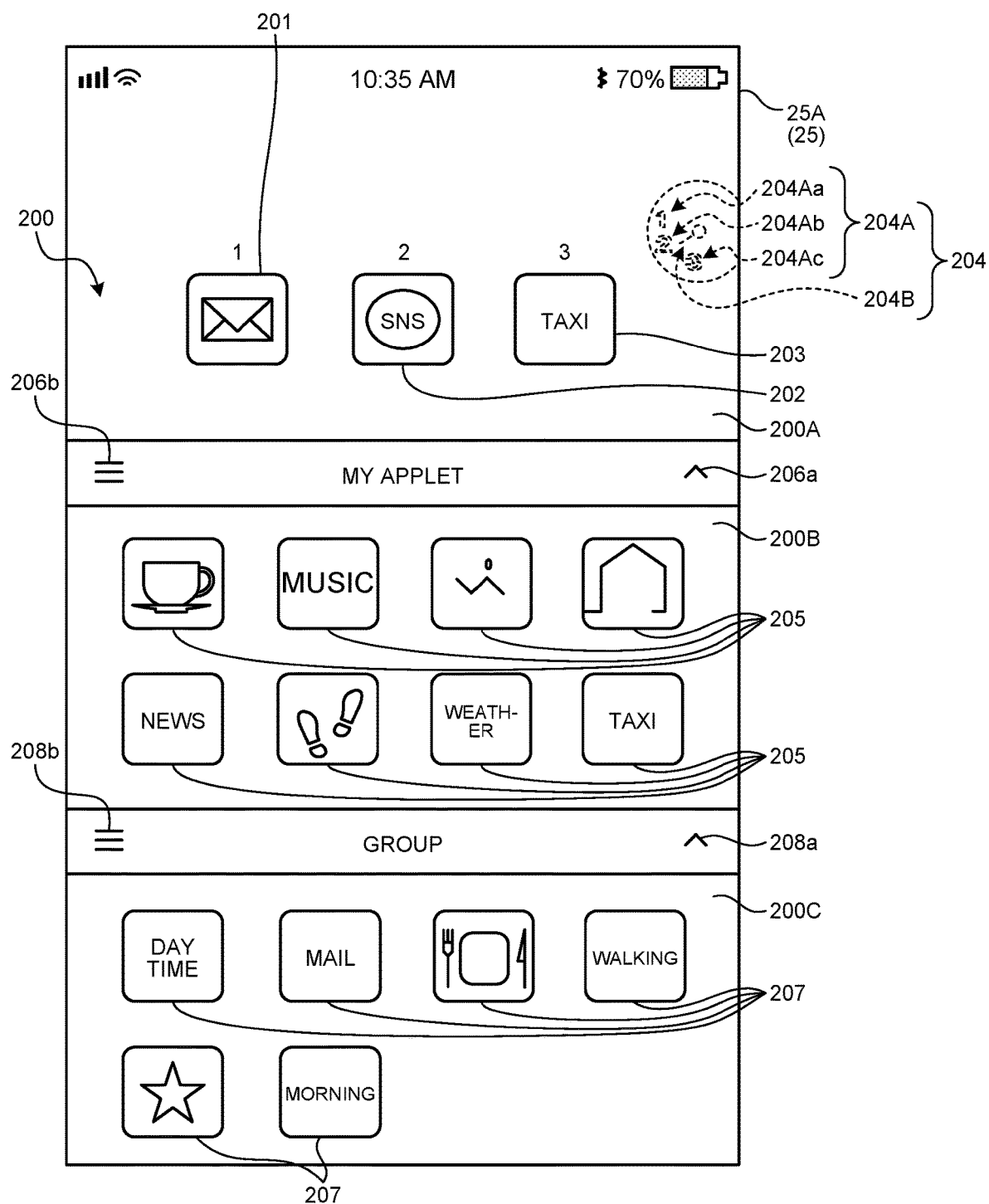
FIG. 9 is a schematic diagram illustrating an example of the selection screen for applets of the portable communication device cooperation system according to the modification.

For example, the control unit 27 can also display a communication state between the master portable communication device 20 and the slave portable communication device 30 using the selected slot image 204 in the slot display region 200A. In a case in which the master portable communication device 20 and the slave portable communication device 30 are enabled to communicate with each other via the communication unit 22 and the communication unit 32, for example, the control unit 27 causes the display 25A to display the selected slot image 204 to represent that the master portable communication device 20 and the slave portable communication device 30 are in a communication enabled state (refer to FIG. 7 and FIG. 8). On the other hand, for example, in a case in which the master portable communication device 20 and the slave portable communication device 30 are disabled from communicating with each other via the communication unit 22 and the communication unit 32, the control unit 27 causes the display 25A not to display the selected slot image 204 to represent that the master portable communication device 20 and the slave portable communication device 30 are in a communication disabled state (refer to FIG. 9). With this configuration, the portable communication device cooperation system S1, the master portable communication device 20, and the slave portable communication device 30 can properly report the communication state between the master portable communication device 20 and the slave portable communication device 30 based on a display state of the selected slot image 204.

<Additional Item 3 of Modification: Display of Communication State 2>

Figure 10:
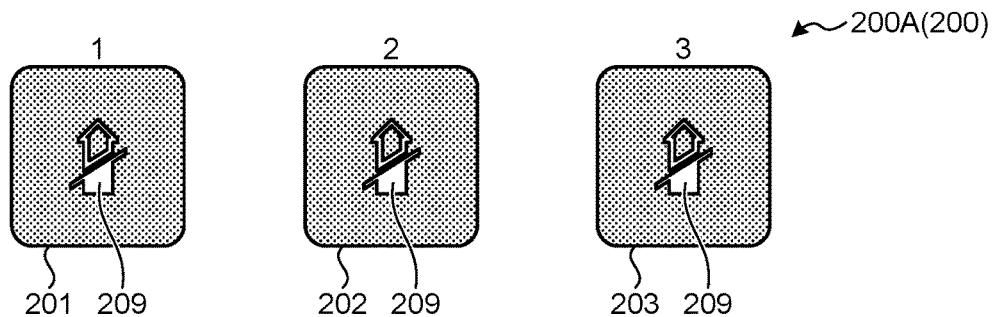
FIG. 10 is a schematic diagram illustrating part of the selection screen for applets of the portable communication device cooperation system according to the modification.

In a case in which the partial applets are being transmitted from the master portable communication device 20 to the slave portable communication device 30, for example, as exemplified in FIG. 10, the control unit 27 can cause the selection screen 200 to display a communicating image 209 representing that the applets are being transmitted. The communicating image 209 is, for example, an image that is displayed being superimposed on the slot icon images 201, 202, and 203, and an image imitating a "white broken arrow mark" in the example of FIG. 10, for example. In a case in which the partial applets are being transmitted from the master portable communication device 20 to the slave portable communication device 30, for example, the control unit 27 causes the selection screen 200 to display the slot icon images 201, 202, and 203 corresponding to the slots that store the partial applets being transmitted in gray. Additionally, the control unit 27 displays the communicating images 209 to be superimposed on the slot icon images 201, 202, and 203. When transmission of the partial applets to the slave portable communication device 30 is completed, the control unit 27 causes the communicating image 209 not to be displayed. Due to this, the portable communication device cooperation system S1, the master portable communication device 20, and the slave portable communication device 30 can report that the partial applets are being transmitted from the master portable communication device 20 to the slave portable communication device 30 on the selection screen 200.

Figure 11:
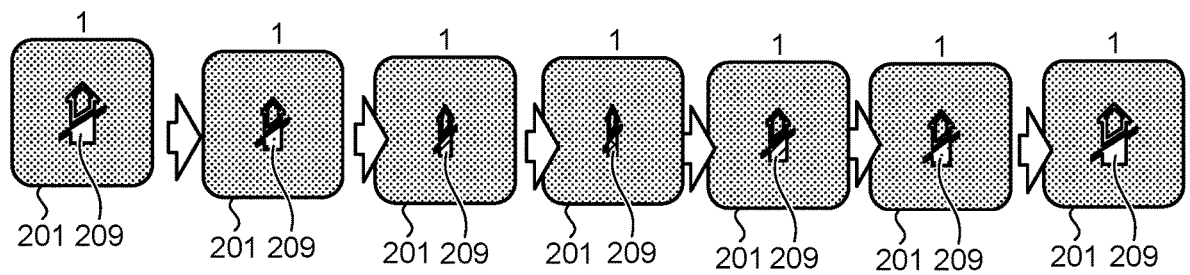
FIG. 11 is a schematic diagram illustrating part of the selection screen for applets of the portable communication device cooperation system according to the modification.

The communicating image 209 is not limited to the image imitating the "white broken arrow mark", and may be an image imitating a "clock mark" and the like to indicate that work is being performed, for example. Alternatively, the control unit 27 may display the communicating image 209 as an animation. In this case, for example, as illustrated in FIG. 11, the control unit 27 may perform animation display by three-dimensionally rotating the "white broken arrow mark" represented by the communicating image 209 about a center axis (in FIG. 11, an axis along a vertical direction) of the arrow mark, or periodically repeating display of reducing the size of the arrow mark and increasing the size thereafter. In this case, the control unit 27 may represent progress of transmission, a communication status, and the like based on rotational speed of the "white broken arrow mark" represented by the communicating image 209, a period of changing the size, or the like. Alternatively, for example, the control unit 27 may perform animation display by gradation-displaying the "white broken arrow mark" represented by the communicating image 209, and periodically changing the gradation display in the vertical direction of the arrow mark. In this case, the control unit 27 may represent progress of transmission, a communication status, and the like based on a change ratio, a change period, and the like of the gradation display of the "white broken arrow mark" represented by the communicating image 209. Due to this, the portable communication device cooperation system S1, the master portable communication device 20, and the slave portable communication device 30 can more clearly report that the partial applets are being transmitted from the master portable communication device 20 to the slave portable communication device 30 on the selection screen 200.

Figure 12:
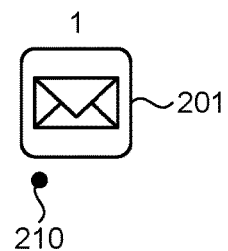
FIG. 12 is a schematic diagram illustrating part of the selection screen for applets of the portable communication device cooperation system according to the modification.

For example, as illustrated in FIG. 12, the control unit 27 can cause the selection screen 200 to display a transmission completed applet image 210 representing that transmission of the partial applet from the master portable communication device 20 to the slave portable communication device 30 is completed in the vicinity of the slot icon images 201, 202, and 203 representing the slots (the master-side slot 26S, the slave-side slot 38S) that are currently selected and the applets are executed therein. In this case, for example, lighting of the transmission completed applet image 210 may represent that transmission of the partial applet from the master portable communication device 20 to the slave portable communication device 30 is completed, and blinking of the transmission completed applet image 210 may represent that the partial applet is being transmitted. Due to this, the portable communication device cooperation system S1, the master portable communication device 20, and the slave portable communication device 30 can more clearly display the currently selected slot by the transmission completed applet image 210 in the master portable communication device 20.

Alternatively, for example, the control unit 27 may cause the selection screen 200 to display a transmission incomplete image (for example, an image imitating a "prohibition mark" or a "cross mark") representing the slot (the master-side slot 26S, the slave-side slot 38S) in which transmission of the partial applet from the master portable communication device 20 to the slave portable communication device 30 is not completed to be superimposed on or in the vicinity of the slot icon images 201, 202, and 203. In a case in which transmission of the partial applet from the master portable communication device 20 to the slave portable communication device 30 failed in midstream depending on a communication status and the like, for example, the control unit 27 may similarly cause the transmission incomplete image to be displayed. In this case, for example, at the time when the communication status is recovered, and the master portable communication device 20 and the slave portable communication device 30 are caused to be in a communication enabled state again, the control unit 27 may transmit the partial applet again.

The portable communication device cooperation system, the master portable communication device, and the slave portable communication device according to the present embodiment may be configured by appropriately combining the constituent elements of the embodiment and the modification described above.

REFERENCE SIGNS LIST

3 Indicator (action execution unit)
5 Date plate (action execution unit)
10 External device
20 Master portable communication device
22 Communication unit (master-side communication unit, action execution unit)
23 Input unit (switching operation unit, trigger generation unit)
24 Detection unit (trigger generation unit)
25 Output unit (action execution unit)
25A Display (display unit)
26 Storage unit (master-side storage unit)
26S Master-side slot
27 Control unit (master-side control unit)
30 Slave portable communication device (wearable device)
30A Electronic watch (wearable device, analog electronic watch)
32 Communication unit (slave-side communication unit, action execution unit)
33 Clocking unit (trigger generation unit)
34 Driving unit (action execution unit)
35 Operation unit (switching operation unit, trigger generation unit)
36 Detection unit (trigger generation unit)
37 Output unit (action execution unit)
38 Storage unit (slave-side storage unit)
38S Slave-side slot
38a Slave-side reference slot (reference slot)
39 Control unit (slave-side control unit)
S1 Portable communication device cooperation system

The invention claimed is:

1. A portable communication device cooperation system comprising:
   a master portable communication device including a master-side communication unit configured communicate with other devices, a master-side storage unit including a plurality of master-side slots configured to respectively store application programs, and a master-side control unit configured to execute the application programs stored in the master-side storage unit; and
   a slave portable communication device including a slave-side communication unit configured to communicate with other devices, a slave-side storage unit including a plurality of slave-side slots configured respectively store application programs, and a slave-side control unit configured to execute the application programs stored in the slave-side storage unit, wherein
   the master-side slots respectively store master application programs configured to cause the master portable communication device and the slave portable communication device to operate in cooperation with each other, and
   the slave-side slots respectively store slave application programs that are each transferred from a corresponding one of the master-side slots via the master-side communication unit and the slave-side communication unit, each include part of information of the master application program, and are each configured to cause the slave portable communication device to operate by being executed by the slave-side control unit,
   an operation unit of the slave portable communication device functions as a switching operation unit of a slave application program of the stored slave application programs by the slave portable communication device,
   the slave-side control unit selects the slave application program in the slave-side slots in accordance with an operation of the switching operation unit, and transmits a linked command to the master portable communication device, and when receiving the linked command, the master-side control unit selects the master-side slot while linking with selection of the slave application program in the slave-side slot, and starts the master application program of the corresponding slot.

2. The portable communication device cooperation system according to claim 1, wherein
the master-side control unit and the slave-side control unit switch a combination of master application programs to be stored in the master-side slots and a combination of slave application programs to be stored in the slave-side slots in accordance with a switching condition set in advance.

3. The portable communication device cooperation system according to claim 2, wherein
the slave-side slots include a reference slot that is set to be distinguished from the other slave-side slots in advance.

4. The portable communication device cooperation system according to claim 1, wherein
the slave-side slots include a reference slot that is set to be distinguished from the other slave-side slots in advance.

5. The portable communication device cooperation system according to claim 4, wherein
the reference slot stores the slave application program for causing the slave portable communication device to display a time.

6. The portable communication device cooperation system according to claim 5, wherein
the reference slot is selected by the slave-side control unit and the slave application program stored in the reference slot is executed in a case in which an operation corresponding to the slave application program stored in the other slave-side slot ends, in a case in which any of the slave application programs is not executed by the slave-side control unit, in a case in which communication with the outside via the slave-side communication unit is disabled, in a case of returning from the state in which communication with the outside via the slave-side communication unit is disabled, in a case in which the slave application program is not stored in the other slave-side slot, or in a case in which electric power of a power supply of the slave portable communication device becomes equal to or smaller than a threshold set in advance.

7. The portable communication device cooperation system according to claim 4, wherein
the reference slot is selected by the slave-side control unit and the slave application program stored in the reference slot is executed in a case in which an operation corresponding to the slave application program stored in the other slave-side slot ends, in a case in which any of the slave application programs is not executed by the slave-side control unit, in a case in which communication with the outside via the slave-side communication unit is disabled, in a case of returning from the state in which communication with the outside via the slave-side communication unit is disabled, in a case in which the slave application program is not stored in the other slave-side slot, or in a case in which electric power of a power supply of the slave portable communication device becomes equal to or smaller than a threshold set in advance.

8. The portable communication device cooperation system according to claim 4, wherein
the master portable communication device includes a display unit configured to be controlled by the master-side control unit and to be able to display an image,
the display unit is configured to display a selected slot image representing the slave-side slot that stores the slave application program that is currently selected as the slave application program executed by the slave-side control unit among the slave application programs stored in the respective slave-side slots,
the selected slot image includes a slot image representing the slave-side slot other than the reference slot among the slave-side slots and an indicator image representing an indicator, and
the master-side control unit causes the display unit to display the selected slot image and indicates the corresponding slot image by the indicator image in a case in which the slave-side slot that stores the slave application program that is currently selected is the slave-side slot other than the reference slot, and causes the display unit to display the selected slot image and indicates a position other than the slot image by the indicator image in a case in which the slave-side slot that stores the slave application program that is currently selected is the reference slot.

9. The portable communication device cooperation system according to claim 1, wherein
the slave portable communication device is a wearable device that is configured to be put on a human body.

10. The portable communication device cooperation system according to claim 1, wherein
the slave portable communication device is an electronic watch that displays a time by an indicator.

11. The portable communication device cooperation system according to claim 1, further comprising:
an external device configured to store the master application programs, wherein
the master portable communication device is configured to download the master application programs stored in the external device via the master-side communication unit.

12. The portable communication device cooperation system according to claim 1, wherein
the master application programs each include a service block program that defines output information to be output in accordance with service content, a trigger block program that defines content of a trigger for starting an action for outputting the output information and a trigger generation unit that generates the trigger to cause the trigger generation unit to generate the trigger, and an action block program that defines content of the action for outputting the output information and an action execution unit that executes the action to cause the action execution unit to execute the action, and
the slave application program includes at least part of the service block program, the trigger block program, or the action block program.

13. The portable communication device cooperation system according to claim 1, wherein
when the master application programs are stored in the master-side slots in a state in which the master portable communication device and the slave portable communication device are disabled from communicating with each other via the master-side communication unit and the slave-side communication unit, the master-side control unit collectively transmits the slave application programs corresponding to the master application programs stored in the master-side slots in the communication disabled state to the slave portable communication device at the time when the master portable communication device and the slave portable communication device are enabled to communicate with each other via the master-side communication unit and the slave-side communication unit.

14. The portable communication device cooperation system according to claim 1, wherein
   the master portable communication device includes a display unit configured to be controlled by the master-side control unit and to be able to display an image,
   the display unit is configured to display a selected slot image representing the slave-side slot that stores the slave application program that is currently selected as the slave application program executed by the slave-side control unit among the slave application programs stored in the respective slave-side slots, and
   the master-side control unit causes the display unit to display the selected slot image in a case in which the master portable communication device and the slave portable communication device are enabled to communicate with each other via the master-side communication unit and the slave-side communication unit, and causes the display unit not to display the selected slot image in a case in which the master portable communication device and the slave portable communication device are disabled from communicating with each other via the master-side communication unit and the slave-side communication unit.

* * * * *